US012608328B2

(12) United States Patent
Lee

(10) Patent No.: US 12,608,328 B2
(45) Date of Patent: Apr. 21, 2026

(54) USB HUB WITH MULTIPLE UPSTREAM-FACING-PORTS AND DATA TRANSMISSION METHOD THEREOF

(71) Applicant: GENESYS LOGIC, INC., New Taipei City (TW)

(72) Inventor: Wei-Te Lee, New Taipei City (TW)

(73) Assignee: GENESYS LOGIC, INC., New Taipei City (TW)

( * ) Notice: Subject to any disclaimer, the term of this patent is extended or adjusted under 35 U.S.C. 154(b) by 28 days.

(21) Appl. No.: 18/741,723

(22) Filed: Jun. 12, 2024

(65) Prior Publication Data

US 2025/0061075 A1     Feb. 20, 2025

Related U.S. Application Data

(60) Provisional application No. 63/533,133, filed on Aug. 17, 2023.

(30) Foreign Application Priority Data

Apr. 12, 2024     (TW) ................................. 113113679

(51) Int. Cl.
| | |
|---|---|
| *G06F 13/38* | (2006.01) |
| *G06F 13/40* | (2006.01) |
| *G06F 13/42* | (2006.01) |

(52) U.S. Cl.
CPC ........ G06F 13/382 (2013.01); G06F 13/4068 (2013.01); G06F 13/4282 (2013.01)

(58) Field of Classification Search
CPC ..................................................... G16H 20/40
See application file for complete search history.

(56) References Cited

U.S. PATENT DOCUMENTS

| | | | | |
|---|---|---|---|---|
| 7,627,708 B2 * | 12/2009 | Bohm | ................... | G06F 13/385 |
| | | | | 710/110 |
| 8,447,890 B1 * | 5/2013 | LeTourneur | ........ | G06F 13/4022 |
| | | | | 710/63 |
| 2019/0319814 A1 * | 10/2019 | Das | ....................... | H04W 16/14 |

FOREIGN PATENT DOCUMENTS

| | | |
|---|---|---|
| CN | 113238979 | 8/2021 |
| CN | 114281745 | 4/2022 |
| CN | 116303186 | 6/2023 |

(Continued)

OTHER PUBLICATIONS

"Office Action of Taiwan Counterpart Application", issued on Jul. 15, 2025, p. 1-p. 18.

*Primary Examiner* — Henry Tsai
*Assistant Examiner* — Juanito C Borromeo
(74) *Attorney, Agent, or Firm* — JCIPRNET

(57) ABSTRACT

The USB hub includes multiple upstream-facing-port (UFP) connectors, multiple downstream-facing-port (DFP) connectors, and multiple hub controllers. A first upstream-port of a first hub controller is coupled to a first UFP connector. A first downstream-port of the first hub controller is coupled to a first DFP connector. A first upstream-port of a second hub controller is coupled to a second UFP connector. A first downstream-port of the second hub controller is coupled to a second DFP connector. A second upstream-port of the first hub controller is coupled to a second downstream-port of the second hub controller, and/or a second upstream-port of the second hub controller is coupled to a second downstream-port of the first hub controller.

20 Claims, 20 Drawing Sheets

(56) References Cited

FOREIGN PATENT DOCUMENTS

| TW | 470887 | 1/2002 |
| TW | 200515652 | 5/2005 |
| TW | 200709519 | 3/2007 |
| TW | 200823669 | 6/2008 |
| TW | 202225992 | 7/2022 |
| TW | M661127 | 10/2024 |

* cited by examiner

USB HUB WITH MULTIPLE UPSTREAM-FACING-PORTS AND DATA TRANSMISSION METHOD THEREOF

CROSS-REFERENCE TO RELATED APPLICATION

This application claims the priority benefits of U.S. provisional application Ser. No. 63/533,133, filed on Aug. 17, 2023, and Taiwanese application serial no. 113113679, filed on Apr. 12, 2024. The entirety of each of the above-mentioned patent applications is hereby incorporated by reference herein and made a part of this specification.

BACKGROUND

Technical Field

This disclosure relates to an Universal Serial Bus (USB) apparatus, and in particular to an USB hub with multiple upstream-facing-ports.

Description of Related Art

Universal Serial Bus is a serial port bus standard for connecting a host to an external apparatus and a technical specification for input and output interfaces. USB is widely used in personal computers, mobile devices, photographic equipment, digital TV (set-top boxes), game consoles, etc. USB hubs allow an USB host to connect more USB devices. The USB devices may include keyboards, mice, printers, or other peripherals. The USB Hub also serves as a repeater to broadcast data downstream from the USB host to the USB device (external device), and to transmit data upstream from the USB device to the USB host.

Usually, USB hubs have only one USB upstream-facing-port (UFP) connector to connect to an USB host, and the rest of the connectors are USB downstream-facing-port (DFP) connectors to connect to USB devices. Normal USB hubs cannot connect to more than one USB host at the same time.

SUMMARY

The disclosure provides an Universal Serial Bus (USB) hub and a data transmission method thereof, capable of flexibly and dynamically allocating resources of multiple downstream-facing-port connectors to a first upstream-facing-port connector and/or second upstream-facing-port connector based on actual operating conditions.

The USB hub in the disclosure includes a first upstream-facing-port (UFP) connector, a second upstream-facing-port connector, multiple downstream-facing-port (DFP) connectors, a first hub controller, and a second hub controller. A first upstream-port of the first hub controller is coupled to the first upstream-facing-port connector. A first downstream-port of the first hub controller is coupled to a first downstream-facing-port connector among the downstream-facing-port connectors. A first upstream-port of the second hub controller is coupled to the second upstream-facing-port connector. A first downstream-port of the second hub controller is coupled to a second downstream-facing-port connector among the downstream-facing-port connectors. A communication terminal of the second hub controller is coupled to a communication terminal of the first hub controller. A second upstream-port of the first hub controller is coupled to a second downstream-port of the second hub controller; or, a second upstream-port of the second hub controller is coupled to a second downstream-port of the first hub controller; or, the second upstream-port of the first hub controller is coupled to the second downstream-port of the second hub controller and the second upstream-port of the second hub controller is coupled to the second downstream-port of the first hub controller.

A data transmission method of the USB hub of the disclosure includes the following. The USB hub is provided. A first host is coupled to a first upstream-facing-port connector. An USB device is coupled to one of downstream-facing-port connectors and controlled by the first host. A second host is coupled to a second upstream-facing-port connector. Whether a first hub controller or a second hub controller obtains mode control information is determined. In response to the mode control information obtained by the first hub controller or the second hub controller being that the USB device is required to be controlled by the second host, the USB device controlled by the first host switches to be controlled by the second host.

Based on the above, the USB hub described in the embodiments of the disclosure may be connected to one or more hosts. Based on the actual operating scenarios, the USB hub may flexibly and dynamically allocate the resources of multiple downstream-facing-port connectors to the first upstream-facing-port connector and/or the second upstream-facing-port connector. For example, the USB hub may selectively allocate the resources of all downstream-facing-port connectors to a single upstream-facing-port connector (first upstream-facing-port connector or second upstream-facing-port connector). Alternatively, the USB hub may selectively allocate the resources of a part of the downstream-facing-port connectors to the first upstream-facing-port connector, and allocate the resources of another part of the downstream-facing-port connectors to the second upstream-facing-port connector. Or, when the first host and the second host are respectively coupled to the first and second upstream-facing-port connectors, the first host may communicate with the second host through the USB hub. Of course, the second host may also communicate with the first host through the USB hub.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate example embodiments of the disclosure and, together with the description, serve to explain the principles of the disclosure.

DESCRIPTION OF THE EMBODIMENTS

Figure 1:
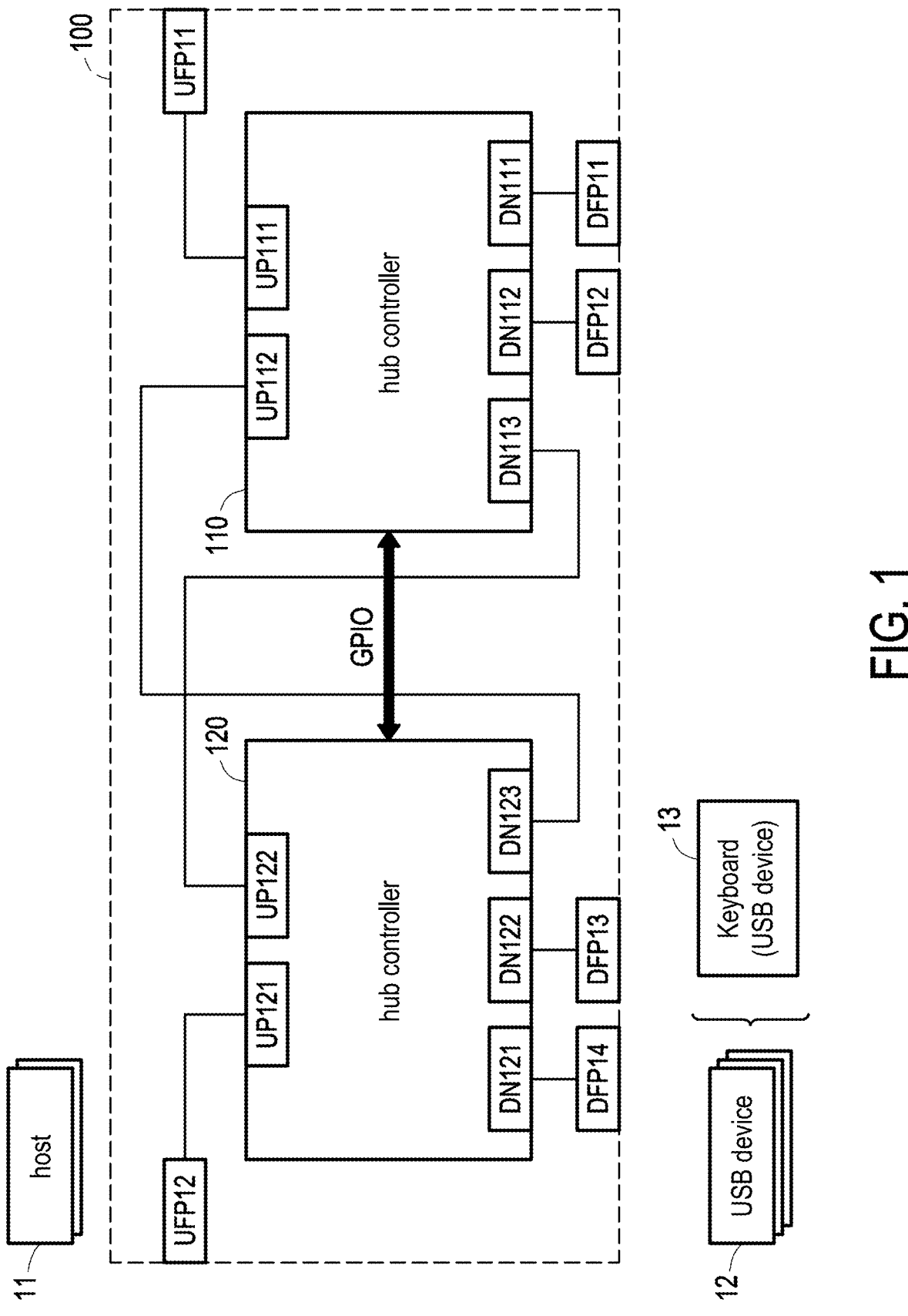
FIG. 1 is a circuit block schematic diagram of an USB hub according to an embodiment of the disclosure.

The word "coupled (or connected)" used throughout the specification of this application (including the claims) can refer to any direct or indirect connection means. For example, if a first device is described as being coupled (or connected) to a second device, it should be interpreted as meaning that the first device can be directly connected to the second device, or that the first device may be indirectly connected to the second device by means of some other device or some means of connection. The terms "first", "second", etc. mentioned throughout the specification of this application (including the claims) are used to name elements, or to distinguish between different embodiments or scopes, and are not intended to limit the upper or lower limit of the number of elements, or the order of the elements. In addition, wherever possible, elements/components/steps with the same reference numerals are used in the drawings and embodiments to represent the same or similar parts. Elements/components/steps using the same reference numerals or using the same terms in different embodiments can refer to the relevant descriptions of each other.

FIG. 1 is a circuit block schematic diagram of an Universal Serial Bus (USB) hub 100 according to an embodiment of the disclosure. The USB hub 100 includes multiple upstream-facing-port connectors UFP11, and UFP12, multiple downstream-facing-port connectors DFP11, DFP12, DFP13, and DFP14, and multiple hub controllers 110 and 120. The upstream-facing-port connector is, for example, an USB upstream-facing-port connector, and the downstream-facing-port connector is, for example, an USB downstream-facing-port connector. Quantities of the upstream-facing-port connectors, the downstream-facing-port connectors, and the hub controllers can be determined according to the actual design. In this specification and drawings, the upstream-facing-port connector of the hub 100 is represented by UFP, and the downstream-facing-port connector is represented by DFP. The upstream-facing-port connectors UFP11 and UFP12 are configured to connect to a host 11. The downstream-facing-port connectors DFP11, DFP12, DFP13, and DFP14 are configured to connect to an USB device 12, a keyboard 13 or other USB devices. In this specification, the host 11 is for example an USB host.

The hub controller 110 includes upstream-ports UP111, UP112, and downstream-ports DN111, DN112, and DN113. The hub controller 120 includes upstream-ports UP121, UP122, and downstream-ports DN121, DN122, and DN123. The upstream-port is, for example, an USB upstream-port, and the downstream-port is, for example, an USB downstream-port. Quantities of the upstream-ports and the downstream-ports of the hub controller 110 can be determined according to the actual design. In addition, in this specification and the drawings, the upstream-port and the downstream-port of the hub controller are represented by UP and DP respectively. The upstream-port UP111 of the hub controller 110 is coupled to the upstream-facing-port connector UFP11, and the downstream-ports DN111 and DN112 of the hub controller 110 are coupled to the downstream-facing-port connectors DFP11 and DFP12 respectively. The upstream-port UP121 of the hub controller 120 is coupled to the upstream-facing-port connector UFP12, and the downstream-ports DN121 and DN122 of the hub controller 120 are coupled to the downstream-facing-port connectors DFP14 and DFP13 respectively.

Following the above, the upstream-port UP112 of the hub controller 110 is coupled to the downstream-port DN123 of the hub controller 120, and the upstream-port UP122 of the hub controller 120 is coupled to the downstream-port DN113 of the hub controller 110. In other embodiments, the upstream-port UP112 of the hub controller 110 is coupled to the downstream-port DN123 of the hub controller 120, but the upstream-port UP122 of the hub controller 120 is not coupled to the downstream-port DN113 of the hub controller 110. Or, the upstream-port UP122 of the hub controller 120 is coupled to the downstream-port DN113 of the hub controller 110, but the upstream-port UP112 of the hub controller 110 is not coupled to the downstream-port DN123 of the hub controller 120.

A communication terminal of the hub controller 110 can be coupled to a communication terminal of the hub controller 120 through a general-purpose input/output (GPIO) interface (or another interface). In FIG. 1, the USB device 12 may include a keyboard 13, which may be coupled to one of the downstream-facing-port connectors DFP11, DFP12, DFP13, and DFP14. When the keyboard 13 is coupled to the hub controller 110 through the downstream-facing-port connector DFP11 or DFP12, the hub controller 110 can decode a hotkey signal of the keyboard 13 to obtain mode control information, and can provide the mode control information to the hub controller 120 through the communication terminal. Similarly, when the keyboard 13 is coupled to the hub controller 120 through the downstream-facing-port connector DFP13 or DFP14, the hub controller 120 can also decode the hotkey signal of the keyboard 13 to obtain the mode control information, and provide the mode control information to the hub controller 110 through the communication terminal. The hub controller 110 and the hub controller 120 can change an operating mode according to the mode control information.

Based on actual operating scenarios, the USB hub 100 can operate in different operating modes to flexibly and dynamically allocate resources of the downstream-facing-port connectors DFP11, DFP12, DFP13, and DFP14 to the upstream-facing-port connectors UFP11 and/or UFP12. For example, when a single host 11 is coupled to the upstream-facing-port connector UFP11 and the upstream-facing-port connector UFP12 is not coupled to any host (first operating scenario), the hub controller 110 may couple to/provide a transmission path between the upstream-facing-port connector UFP11 and the downstream-port DN113 of the hub controller 110, and the hub controller 120 may couple to/provide a transmission path between the downstream-facing-port connector (DFP13 and/or DFP14) and the upstream-port UP122 of the hub controller 120. Thus, in the first operating scenario, in addition to using the resources of the downstream-facing-port connector DFP11 and/or DFP12 through the hub controller 110, the host 11 may also use the resources of the downstream-facing-port connector DFP13 and/or DFP14 through the hub controllers 110 and 120. The upstream-ports UP111, UP122, the downstream-ports DN111, DN112, DN113, DN121, and DN122 are enabled, and the upstream-ports UP112, UP121 and the downstream-port DN123 are disabled.

When the single host 11 is coupled to the upstream-facing-port connector UFP12 and the upstream-facing-port connector UFP11 is not coupled to any host (second operating scenario), the hub controller 120 may couple to/provide a transmission path between the upstream-facing-port connector UFP12 and the downstream-port DN123 of the hub controller 120, and the hub controller 110 may couple to/provide a transmission path between the downstream-facing-port connector (DFP11 and/or DFP12) and the upstream-port UP112 of the hub controller 110. Thus, in the second operating scenario, in addition to using the resources of the downstream-facing-port connector DFP13 and/or DFP14 through the hub controller 120, the host 11 may also use the resources of the downstream-facing-port connector DFP11 and/or DFP12 through the hub controllers 120 and 110. The upstream-ports UP112, UP121, the downstream-ports DN111, DN112, DN121, DN122, and DN123 are enabled, and the upstream-ports UP111, UP122, and the downstream-port DN113 are disabled.

When a host (a first host) is coupled to the upstream-facing-port connector UFP11, and another host (a second host) is coupled to the upstream-facing-port connector UFP12 (third operating scenario), the hub controllers 110 and 120 may selectively operate in one of multiple modes according to the mode control information, as described in more detail below in this disclosure.

In a first mode of the third operating scenario, the hub controller 110 may couple to/provide a transmission path between the upstream-facing-port connector UFP11 and the downstream-port DN113 of the hub controller 110, and the hub controller 120 may couple to/provide a transmission path between the downstream-facing-port connector (DFP13 and/or DFP14) and the upstream-port UP122 of the hub controller 120. Furthermore, in addition to using the resources of the downstream-facing-port connector DFP11 and/or DFP12 through the hub controller 110, the first host may also use the resources of the downstream-facing-port connector DFP13 and/or DFP14 through the hub controllers 110 and 120. The upstream-ports UP111, UP122, the downstream-ports DN111, DN112, DN113, DN121, and DN122 are enabled, and the upstream-ports UP112, UP121, and the downstream-port DN123 are disabled.

In a second mode in the third operating scenario, the hub controller 120 may couple to/provide a transmission path between the upstream-facing-port connector UFP12 and the downstream-port DN123 of the hub controller 120, and the hub controller 110 may couple to/provide a transmission path between the downstream-facing-port connector (DFP11 and/or DFP12) and the upstream-port UP112 of the hub controller 110. Furthermore, in addition to using the resources of the downstream-facing-port connector DFP13 and/or DFP14 through the hub controller 120, the second host may also use the resources of the downstream-facing-port connector DFP11 and/or DFP12 through the hub controllers 120 and 110. The upstream-ports UP112, UP121, the downstream-ports DN111, DN112, DN121, DN122, and DN123 of the hub controller 110 are enabled, and the upstream-ports UP111, UP122 and the downstream-port DN113 are disabled.

In a third mode in the third operating scenario, the upstream-port UP112 of the hub controller 110 is disabled, and the upstream-port UP122 of the hub controller 120 is disabled. Furthermore, the first host connected to the upstream-facing-port connector UFP11 may use the resources of the downstream-facing-port connector DFP11 and/or DFP12 through the hub controller 110, and the second host connected to the upstream-facing-port connector UFP12 may use the resources of the downstream-facing-port connector DFP13 and/or DFP14 through the hub controller 120. The upstream-ports UP111, UP121, the downstream-ports DN111, DN112, DN121, and DN122 of the hub controller 110 are enabled, and the upstream-ports UP112, UP122, the downstream-ports DN113 and DN123 of the hub controller 110 are disabled.

In a fourth mode of the third operating scenario, the hub controller 110 may couple to/provide a transmission path between the upstream-port UP111 of the hub controller 110 and the upstream-port UP112 of the hub controller 110, and the hub controller 120 may couple to/provide a transmission path between the downstream-port DN123 of the hub controller 120 and the upstream-port UP121 of the hub controller 120. Furthermore, the first host may communicate with the second host through the upstream-ports UP111 and UP112 of the hub controller 110 and the downstream-port DN123 and the upstream-port UP121 of the hub controller 120. Similarly, the second host may also communicate with the first host through the same path.

In a fifth mode of the third operating scenario, the hub controller 120 may couple to/provide a transmission path between the upstream-port UP121 of the hub controller 120 and the upstream-port UP122 of the hub controller 120, and the hub controller 110 may couple to/provide a transmission path between the downstream-port DN113 of the hub controller 110 and the upstream-port UP111 of the hub controller 110. Furthermore, the second host may communicate with the first host through the upstream-ports UP121 and UP122 of the hub controller 120 and the downstream-port DN113 and the upstream-port UP111 of the hub controller 110. Similarly, the first host may also communicate with the second host through the same path.

In a sixth mode in the third operating scenario, the hub controller 110 may couple to/provide a transmission path between the upstream-port UP111 of the hub controller 110 and the upstream-port UP112 of the hub controller 110. The hub controller 110 may couple to/provide a transmission path between the downstream-port DN113 of the hub controller 110 and the upstream-port UP111 of the hub controller 110. The hub controller 120 may couple to/provide a transmission path between the upstream-port UP121 of the hub controller 120 and the upstream-port UP122 of the hub controller 120, and the hub controller 120 may couple to/provide a transmission path between the downstream-port DN123 of the hub controller 120 and the upstream-port UP121 of the hub controller 120. Furthermore, the first host may communicate with the second host through the upstream-ports UP111 and UP112 of the hub controller 110 and the downstream-port DN123 and the upstream-port UP121 of the hub controller 120. Similarly, the second host may communicate with the first host through the upstream-ports UP121 and UP122 of the hub controller 120 and the downstream-port DN113 and upstream-port UP111 of the hub controller 110.

Figure 2:
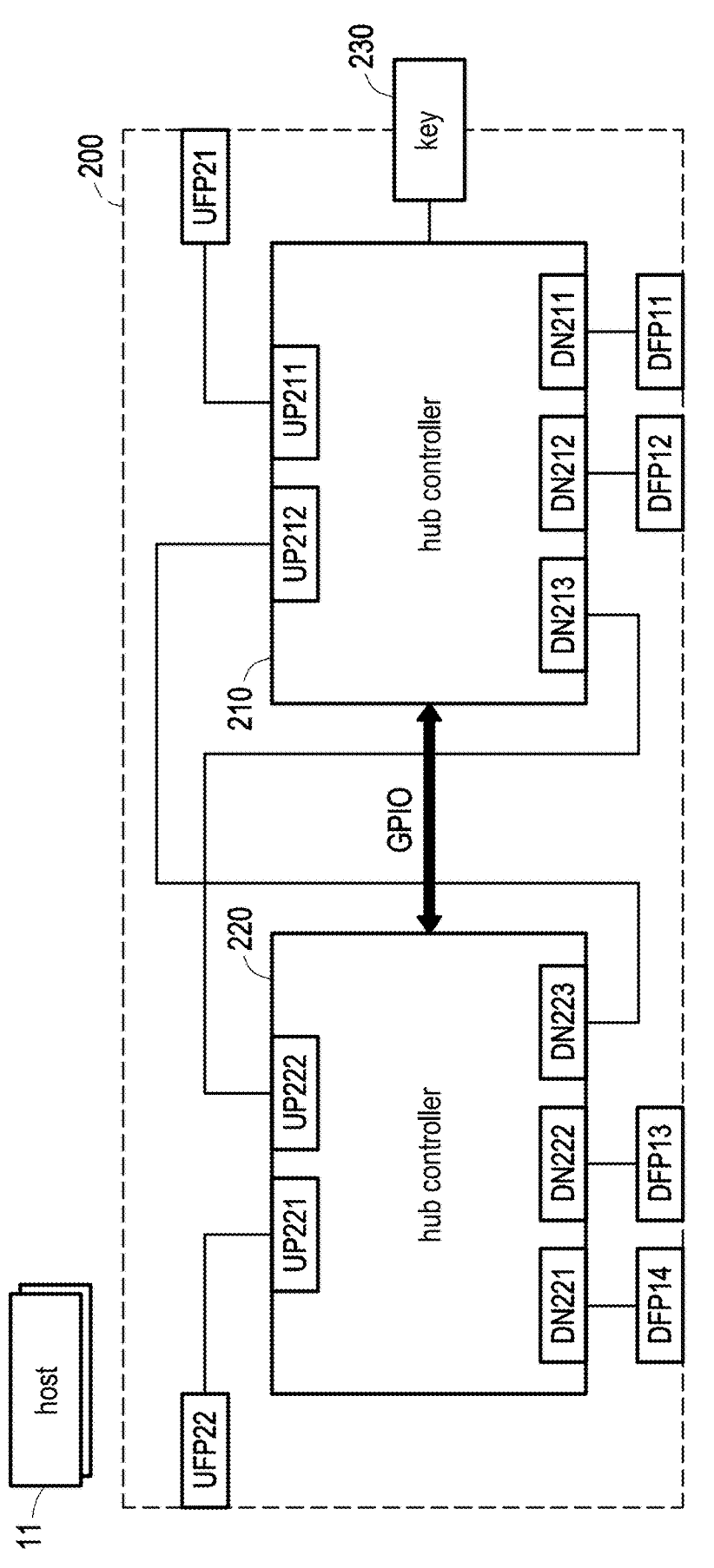
FIG. 2 is a circuit block diagram of an USB hub according to another embodiment of the disclosure.

FIG. 2 is a circuit block diagram of an USB hub 200 according to another embodiment of the disclosure. The USB hub 200 shown in FIG. 2 is similar to the USB hub 100 shown in FIG. 1. The difference between the two is that the USB hub 200 shown in FIG. 2 also includes a key 230. Based on actual design, the key 230 may include one or more keys. The key 230 may be a mechanical key, a touch key, or other key. In the embodiment shown in FIG. 2, the key 230 is coupled to a hub controller 210. This embodiment does not limit the specific implementation of the key 230. For example (but not limited to this), the key 230 may be a simplified keyboard. A user may implement different operation behaviors (e.g., a specific pressing sequence or other operation behaviors) on the key 230 to express a switching command for the operating mode. Alternatively, the key 230 may be a single key. The user may perform different operation behaviors on the key 230 (e.g., click the key 230, double-click the key 230, or other operation behaviors) to express the switching command for the operating mode. Upstream-facing-port connectors UFP21, UFP22, downstream-facing-port connectors DFP21, DFP22, DFP23, DFP24, and hub controllers 210 and 220 shown in FIG. 2 can be referred to and by analogy with relevant descriptions of corresponding components shown in FIG. 1, and therefore will not be repeated in the followings.

In this embodiment, the hub controller 210 can decode a hotkey signal of the key 230 to obtain the mode control information. The hub controller 210 changes the operating mode of the hub controller 210 according to the mode control information. In addition, the hub controller 210 may provide the mode control information to the hub controller 220 through a communication terminal (e.g., a GPIO interface or other interface), so that the hub controller 220 may also change the operating mode of the hub controller 220 according to the mode control information. In other embodiments, the key 230 may also be coupled to the hub controller 220, and the hub controller 220 can be referred to and by analogy with descriptions of the hub controller 210.

In summary, the USB hubs 100 and 200 of the embodiments may be connected to one or more hosts 11. Based on actual operating scenarios, the USB hubs 100 and 200 may flexibly and dynamically allocate resources of multiple downstream-facing-port connectors to different upstream-facing-port connectors. In some operating scenarios, the USB hubs 100 and 200 may selectively allocate resources of all downstream-facing-port connectors to a single upstream-facing-port connector for use by the hosts coupled to the single upstream-facing-port connector. In other operating scenarios, the USB hubs 100 and 200 may also selectively allocate resources of a part of the downstream-facing-port connectors to a certain upstream-facing-port connector, and selectively allocate resources of another part of the downstream-facing-port connectors to another upstream-facing-port connector. In some embodiments, when multiple hosts are coupled to different upstream-facing-port connectors of the USB hub 100 or 200, the first host may communicate with the second host through the USB hub 100 or 200. Similarly, the second host may also communicate with the first host through USB hub 100 or 200.

Figure 3:
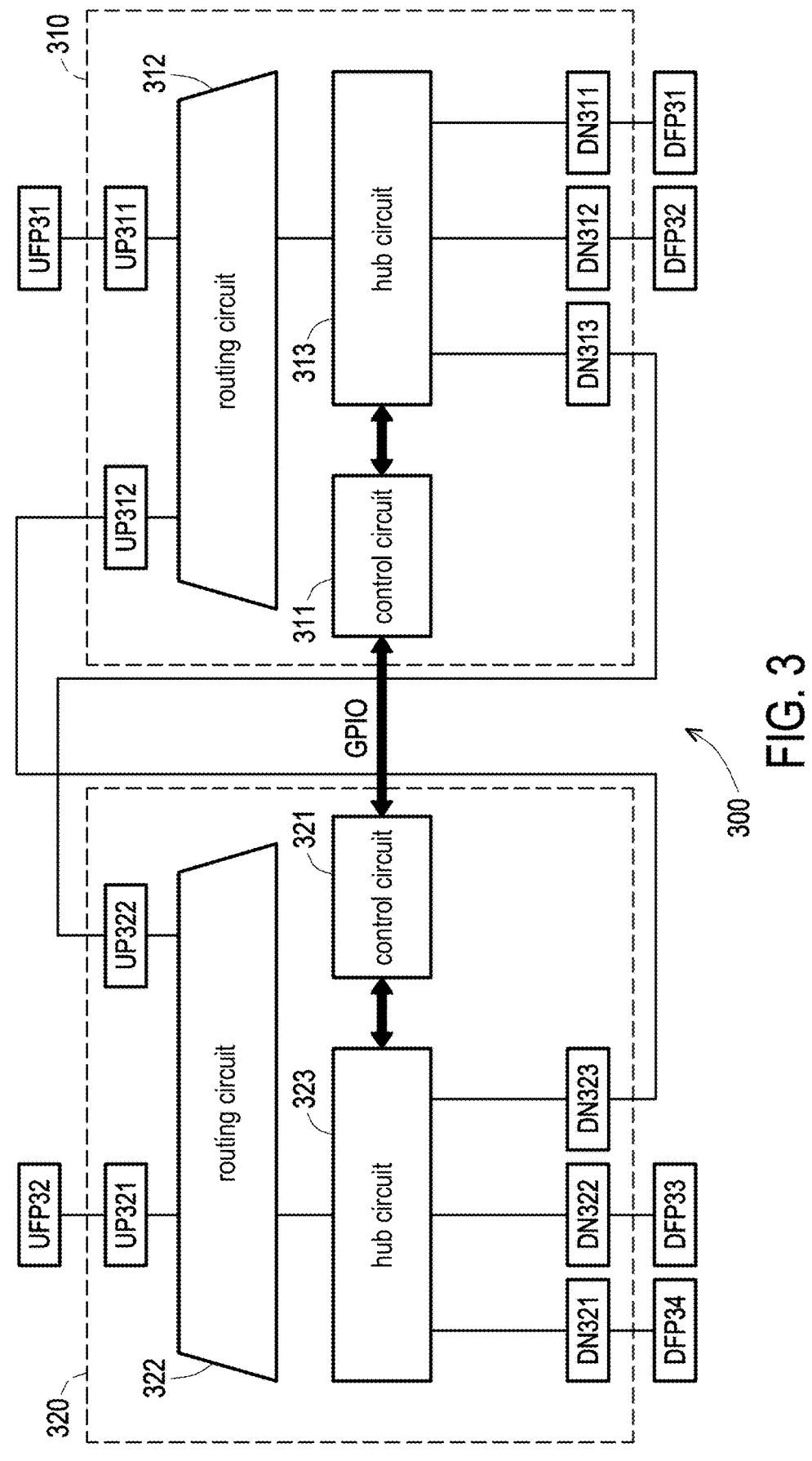
FIG. 3 is a circuit block diagram of an USB hub according to yet another embodiment of the disclosure.

FIG. 3 is a circuit block diagram of an USB hub 300 according to yet another embodiment of the disclosure. Hub controllers 310 and 320 shown in FIG. 3 can be used as one of many implementation examples of the hub controller shown in FIG. 1 and/or FIG. 2. In addition, upstream-facing-port connectors UFP31, UFP32, downstream-facing-port connectors DFP31, DFP32, DFP33, DFP34, and THE hub controllers 310 and 320 shown in FIG. 3 can be referred to and by analogy with relevant descriptions of corresponding components shown in FIG. 1, and FIG. 2, and therefore will not be repeated in the followings. Compared with the USB hub 100 in FIG. 1, the USB hub 300 in FIG. 3 defines the architecture of the hub controller 310 and the hub controller 320 in more detail. The hub controller 310 in this embodiment is defined to also include a control circuit 311, a routing circuit 312, and a hub circuit 313, and the hub controller 320 is defined to also include a control circuit 321, a routing circuit 322, and a hub circuit 323. Upstream-ports and downstream-ports configured by the hub controllers 310 and 320 can be referred to and by analogy with relevant descriptions of corresponding components shown in FIG. 1, and FIG. 2, and therefore will not be repeated in the followings.

Following the above, the control circuit 311 is coupled to a communication terminal of the hub controller 310, and the control circuit 321 is coupled to a communication terminal of the hub controller 320. The control circuit 311 may provide mode control information (hotkey signal) to the control circuit 321 through the communication terminal (e.g., a GPIO interface or another interface) (and vice versa). Thus, the control circuit 311 may control the routing circuit 312 and the hub circuit 313 according to the mode control information, and the control circuit 321 may control the routing circuit 322 and the hub circuit 323 according to the mode control information, thereby changing the operating modes of the hub controllers 310 and 320.

A first port of the routing circuit 312 is coupled to an upstream-port UP311 of the hub controller 310. A second port of the routing circuit 312 is coupled to an upstream-port UP312 of the hub controller 310. A third port of the routing circuit 312 is coupled to a first port of the hub circuit 313. The routing circuit 312 is controlled by the control circuit 311 to dynamically determine coupling relationship between the upstream-ports UP311, UP312, and the hub circuit 313. Multiple second ports of the hub circuit 313 are coupled to downstream-ports DN311 and DN312 of the hub controller 310 respectively. A third port of the hub circuit 313 is coupled to downstream-port DN313 of the hub controller 310. The hub circuit 313 is controlled by the control circuit 311 to dynamically determine routing definition (coupling relationship) between the routing circuit 312, the downstream-ports DN311, DN312, and DN313. Based on the actual operating scenarios, the routing circuit 312 and the hub circuit 313 may flexibly and dynamically allocate resources of the downstream-ports DN311, DN312, and DN313 to the upstream-ports UP311 and/or UP312.

In this embodiment, the routing circuit 312 may include a multiplexer, a demultiplexer, a switching circuit, or other routing circuits. The hub circuit 313 may include an USB router or other USB hub circuit. In some embodiments, the control circuit 311 may be implemented in the form of a hardware circuit, firmware, software (i.e., a program), or a combination of firmware/software. In addition, the implementation of the control circuit 311 may also be a combination of hardware, firmware, and software.

In terms of hardware, the control circuit 311 may be implemented as a logic circuit on an integrated circuit. For example, relevant functions of the control circuit 311 may be implemented in various logic blocks, modules, and circuits in one or more controller, microcontroller, microprocessor, application-specific integrated circuit (ASIC), digital signal processor (DSP), field programmable gate array (FPGA), central processing unit (CPU), and/or other processing units.

In terms of software and/or firmware, relevant functions of the control circuit 311 may be implemented as programming codes. For example, the control circuit 311 is implemented using general programming languages (e.g., C, C++, or combinatorial language) or other suitable programming languages. The programming code may be recorded/stored in a "non-transitory machine-readable storage medium". The non-transitory machine-readable storage medium may include semiconductor memory and/or storage devices. An electronic apparatus (e.g., a CPU, controller, microcontroller, or microprocessor) can read and execute the programming code from the non-transitory machine-readable storage medium, thereby realizing the relevant functions of the control circuit 311.

The control circuit 321, the routing circuit 322, and the hub circuit 323 may be referred to relevant descriptions of the control circuit 311, the routing circuit 312, and the hub circuit 313. The control circuit 311 may control the routing circuit 312 and the hub circuit 313 according to the mode control information, and the control circuit 321 may control the routing circuit 322 and the hub circuit 323 according to the mode control information, thereby changing the operating modes of the hub controllers 310 and 320.

Figure 4A:
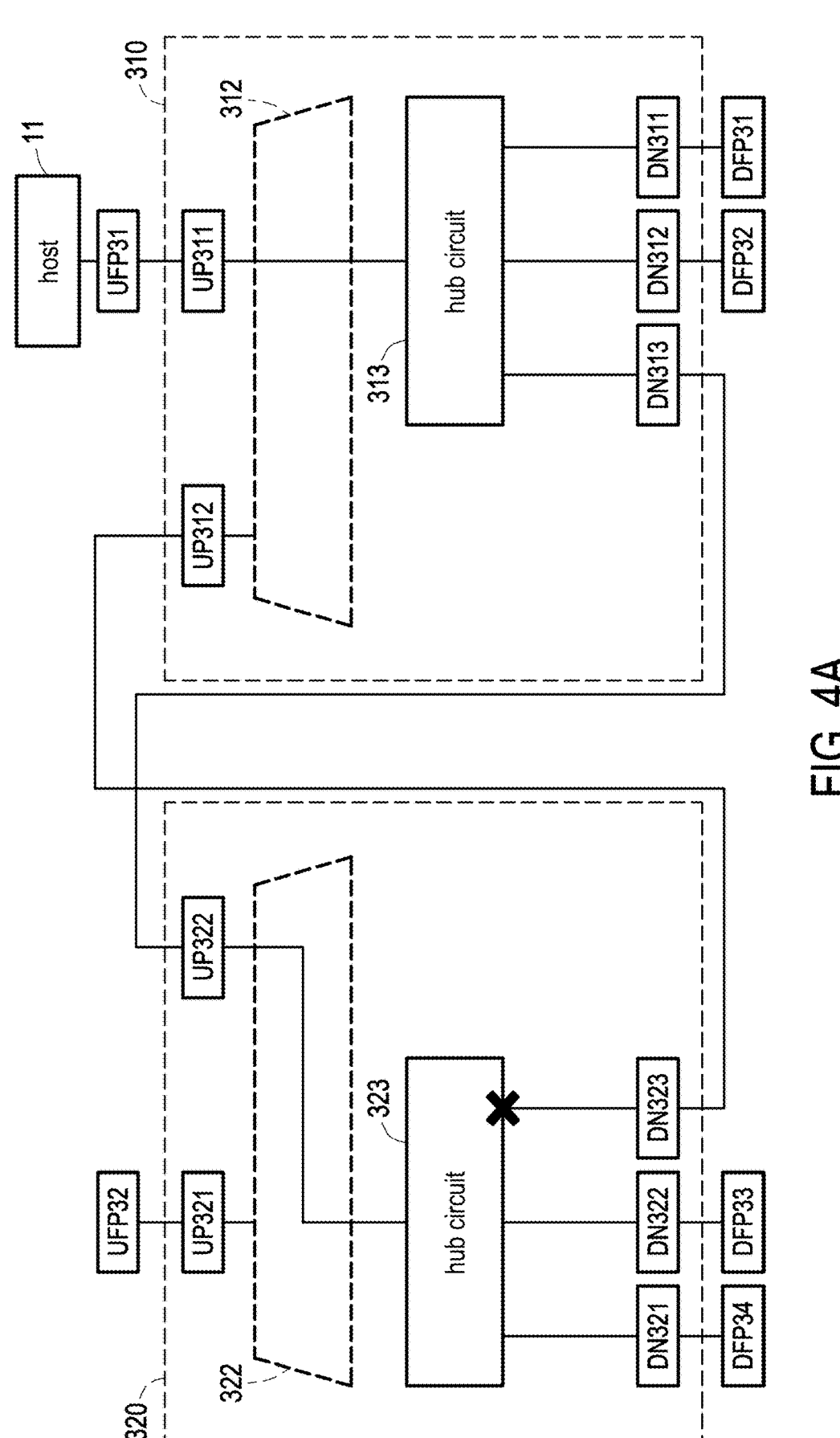
FIG. 4A to FIG. 4E are schematic diagrams of routing switching of a routing circuit shown in different operating scenarios of the disclosure.

FIG. 4A to FIG. 4E are schematic diagrams of routing switching of a routing circuit shown in different operating scenarios of the disclosure. FIG. 4A is a schematic diagram of a circuit shown in FIG. 3 in the first operating scenario. Referring to FIG. 4A first, when the host 11 is coupled to the upstream-facing-port connector UFP31 and the upstream-facing-port connector UFP32 is not coupled to the host, the routing circuit 312 may couple the upstream-port UP311 of the hub controller 310 to the first port of the hub circuit 313, and the routing circuit 322 may couple an upstream-port UP322 of the hub controller 320 to a first port of the hub circuit 323. Thus, in addition to using resources of the downstream-facing-port connector DFP31 and/or DFP32 through the hub circuit 313, the host 11 may also use the resources of the downstream-facing-port connector DFP33 and/or DFP34 through the hub circuits 313 and 323. The upstream-ports UP311, UP322, the downstream-ports DN311, DN312, DN313, DN321, and DN322 are enabled, and the upstream-ports UP312, UP321, and a downstream-port DN323 are disabled.

Figure 4B:
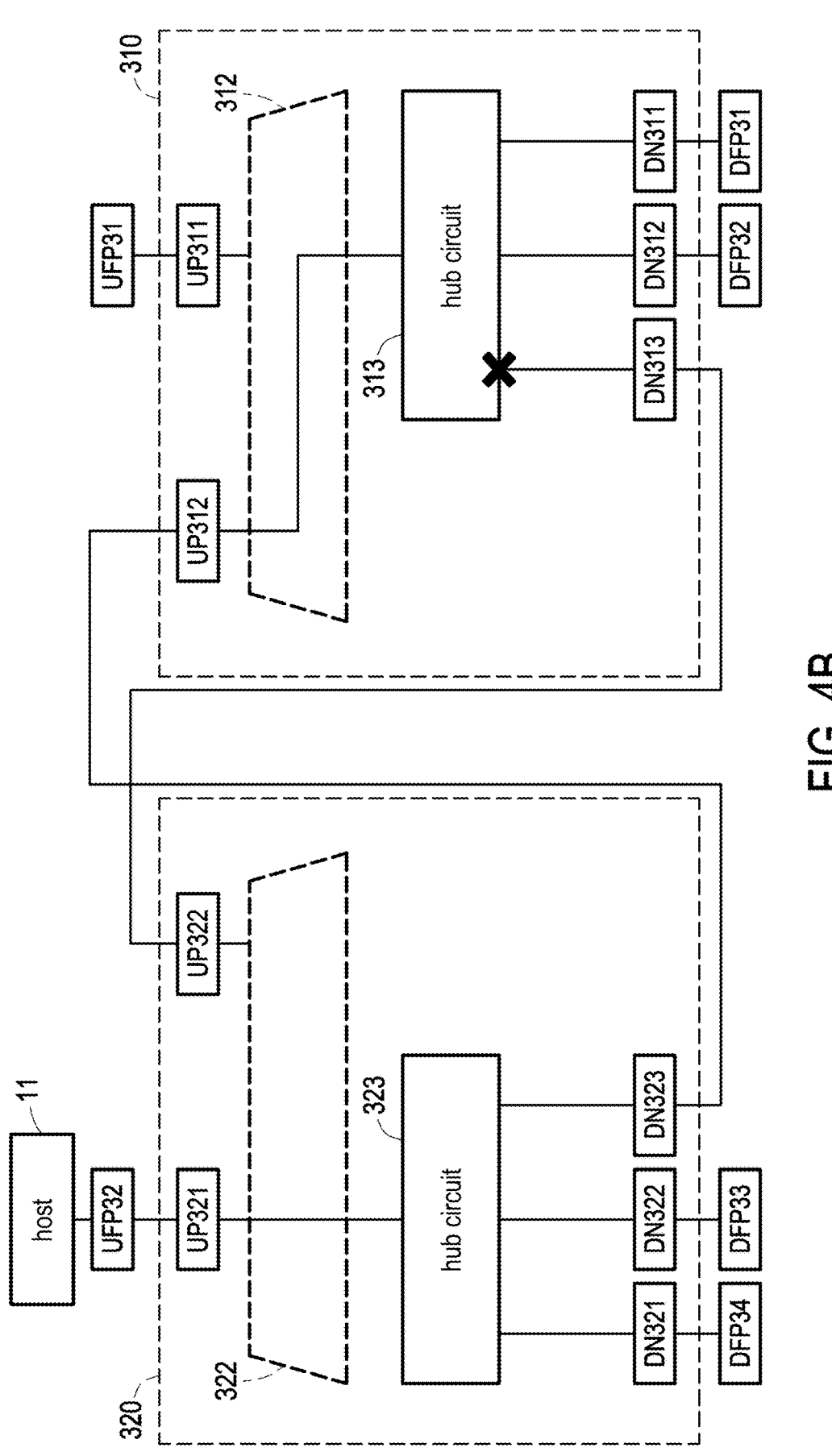

FIG. 4B is a schematic diagram of the circuit shown in FIG. 3 in the second operating scenario. Referring to FIG. 4B, when the host 11 is coupled to the upstream-facing-port connector UFP32 and the upstream-facing-port connector UFP31 is not coupled to the host, the routing circuit 312 may couple the upstream-port UP312 of the hub controller 310 to the first port of the hub circuit 313, and the routing circuit 322 may couple the upstream-port UP321 of the hub controller 320 to the first port of the hub circuit 323. Thus, in addition to using the resources of the downstream-facing-port connector DFP33 and/or DFP34 through the hub circuit 323, the host 11 may also use the resources of the downstream-facing-port connector DFP31 and/or DFP32 through the hub circuits 323 and 313. The upstream-ports UP312, UP321, the downstream-ports DN311, DN312, DN321, DN322, and DN323 are enabled, and the upstream-ports UP311, UP322, and the downstream-port DN313 are disabled.

Figure 4C:
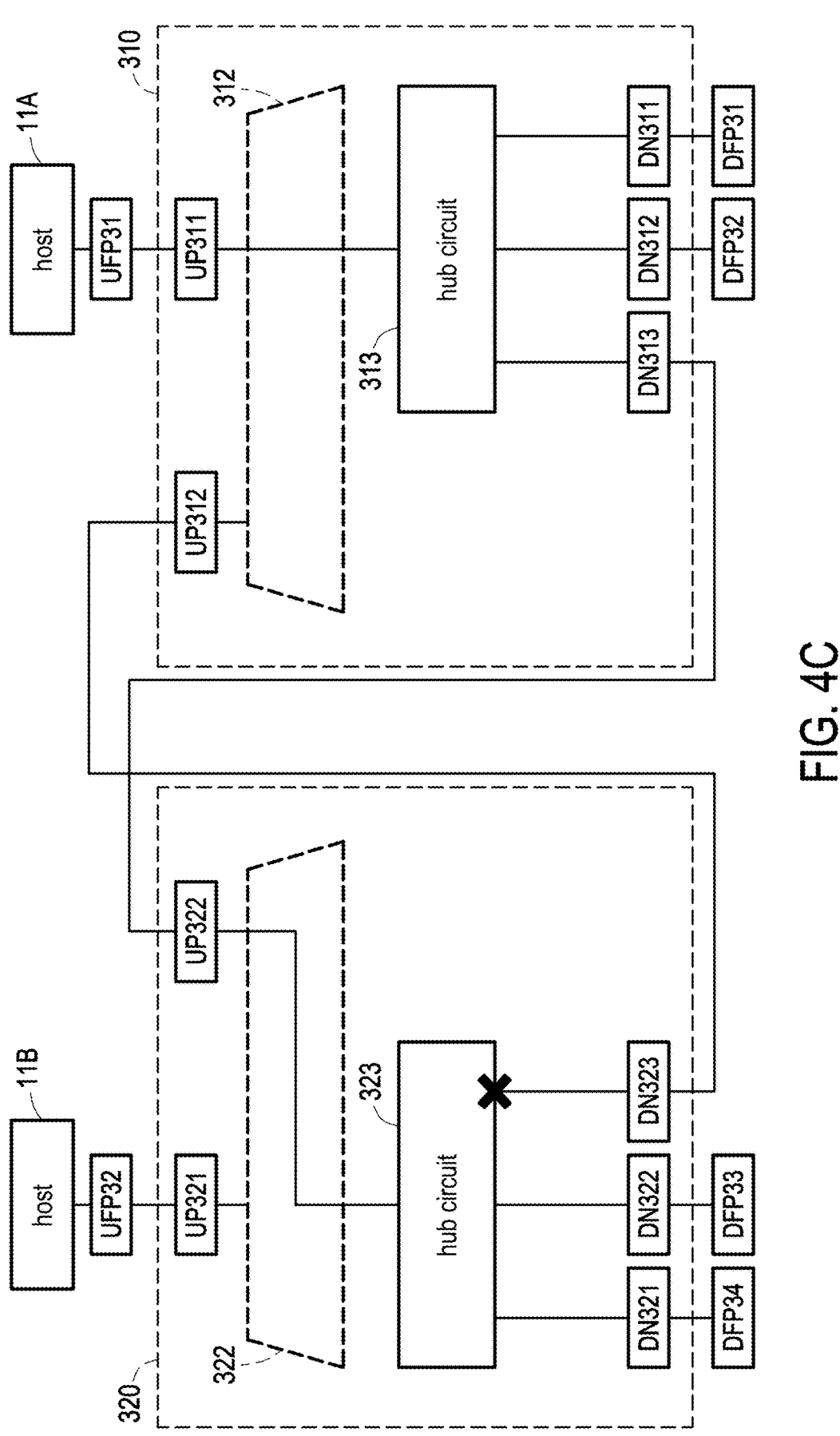
Figure 4D:
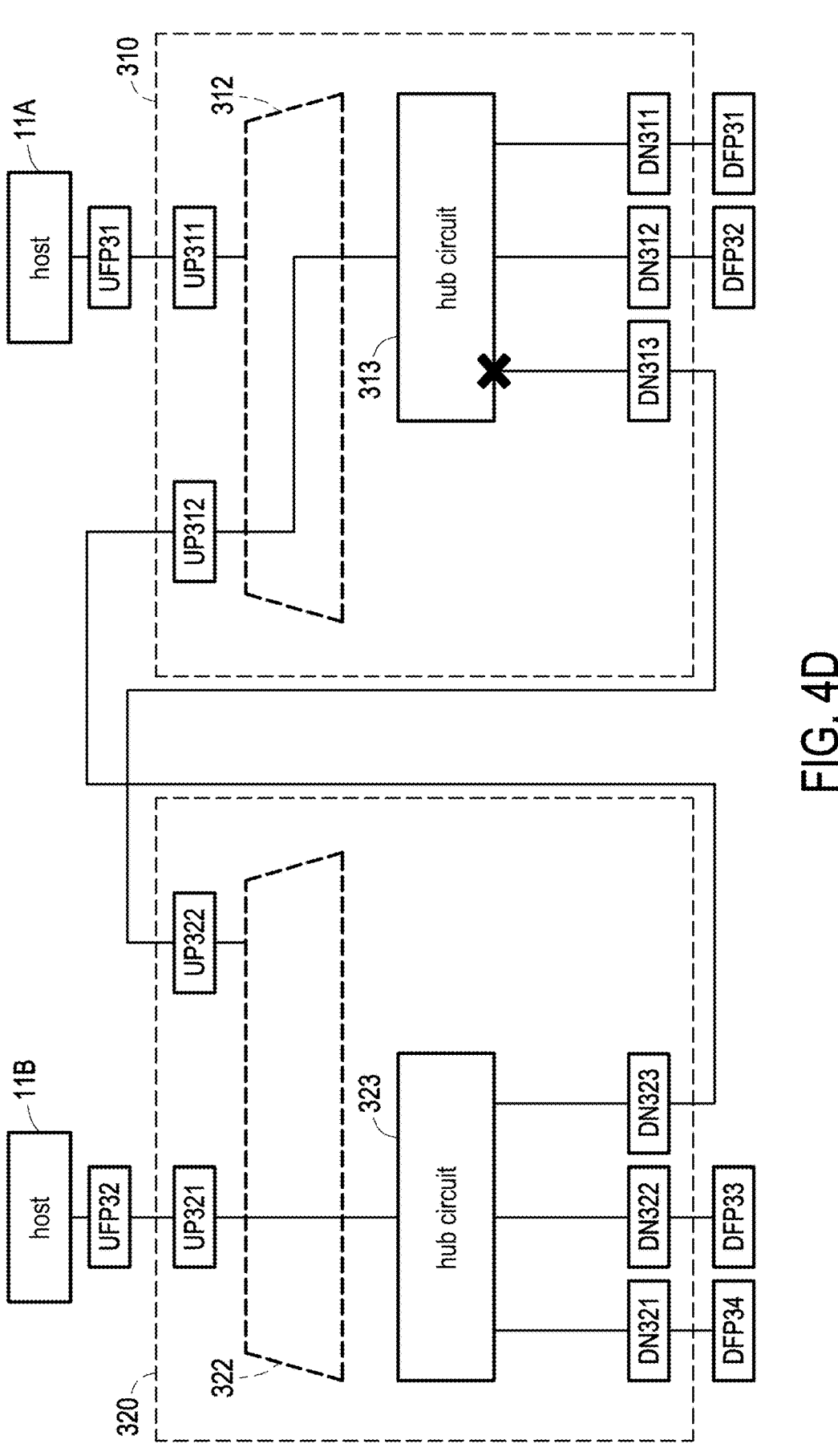
Figure 4E:
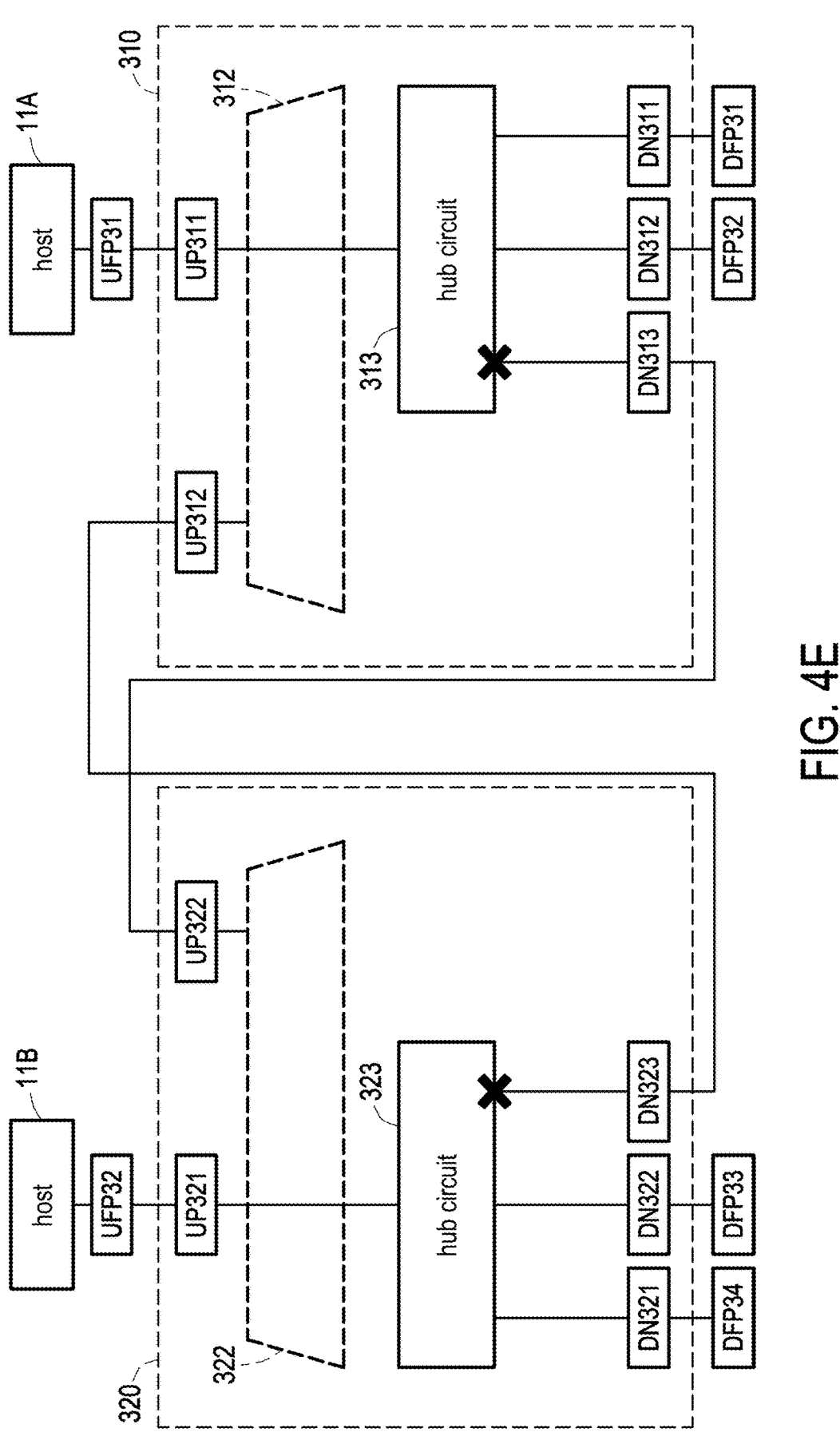

FIG. 4C to FIG. 4E are schematic diagrams of the circuit shown in FIG. 3 in the third operating scenario. As shown in FIG. 4C to FIG. 4E, in the third operating scenario, hosts 11A and 11B are coupled to the upstream-facing-port connectors UFP31 and UFP32 respectively. The hosts 11A and 11B can be referred to the relevant descriptions of the host 11 shown in FIG. 1 or FIG. 2. In the third operating scenario, the control circuit 311 shown in FIG. 3 can control the routing circuit 312 and the hub circuit 313 according to the mode control information (hotkey signal), and the control circuit 321 shown in FIG. 3 can control the routing circuit 322 and the hub circuit 323 according to the mode control information, thereby changing the operating modes of the hub controllers 310 and 320. That is, the hub controllers 310 and 320 can selectively operate in one of multiple modes according to the mode control information (hotkey signal) in the third operating scenario, and FIG. 4C to FIG. 4E are schematic diagrams of routing switching in different operating modes.

When the hub controllers 310 and 320 selectively operate in the first mode (as shown in FIG. 4C), the routing circuit 312 couples the upstream-port UP311 of the hub controller 310 to the first port of the hub circuit 313, and the routing circuit 322 couples the upstream-port UP322 of the hub controller 320 to the first port of the hub circuit 323. Thus, in addition to using the resources of the downstream-facingport connector DFP31 and/or DFP32 through the hub circuit 313, the host 11A may also use the resources of the downstream-facing-port connector DFP33 and/or DFP34 through the hub circuit 313 and the hub circuit 323. The upstream-ports UP311, UP322, the downstream-ports DN311, DN312, DN313, DN321, and DN322 are enabled, and the upstream-ports UP312, UP321 and the downstream-port DN323 are disabled.

When the hub controllers 310 and 320 selectively operate in the second mode (as shown in FIG. 4D), the routing circuit 312 couples the upstream-port UP312 of the hub controller 310 to the first port of the hub circuit 313, and the routing circuit 322 couples the upstream-port UP321 of the hub controller 320 to the first port of the hub circuit 323. Thus, in addition to using the resources of the downstream-facing-port connector DFP33 and/or DFP34 through the hub circuit 323, the host 11B may also use the resources of the downstream-facing-port connector DFP31 and/or DFP32 through the hub circuits 323 and 313. The upstream-ports UP312, UP321, the downstream-ports DN311, DN312, DN321, DN322, and DN323 are enabled, and the upstream-port UP311, the upstream-port UP322, and the downstream-port DN313 are disabled.

When the hub controllers 310 and 320 selectively operate in the third mode (as shown in FIG. 4E), the routing circuit 312 couples the upstream-port UP311 of the hub controller 310 to the first port of the hub circuit 313, and the routing circuit 322 couples the upstream-port UP321 of the hub controller 320 to the first port of the hub circuit 323. Thus, the host 11B may use the resources of the downstream-facing-port connector DFP33 and/or DFP34 through the hub circuit 323, and the host 11A may use the resources of the downstream-facing-port connector DFP31 and/or DFP32 through the hub circuit 313. The upstream-ports UP311, UP321, the downstream-ports DN311, DN312, DN321, and DN322 are enabled, and the upstream-ports UP312, UP322, the downstream-ports DN313 and DN323 are disabled.

Figure 5:
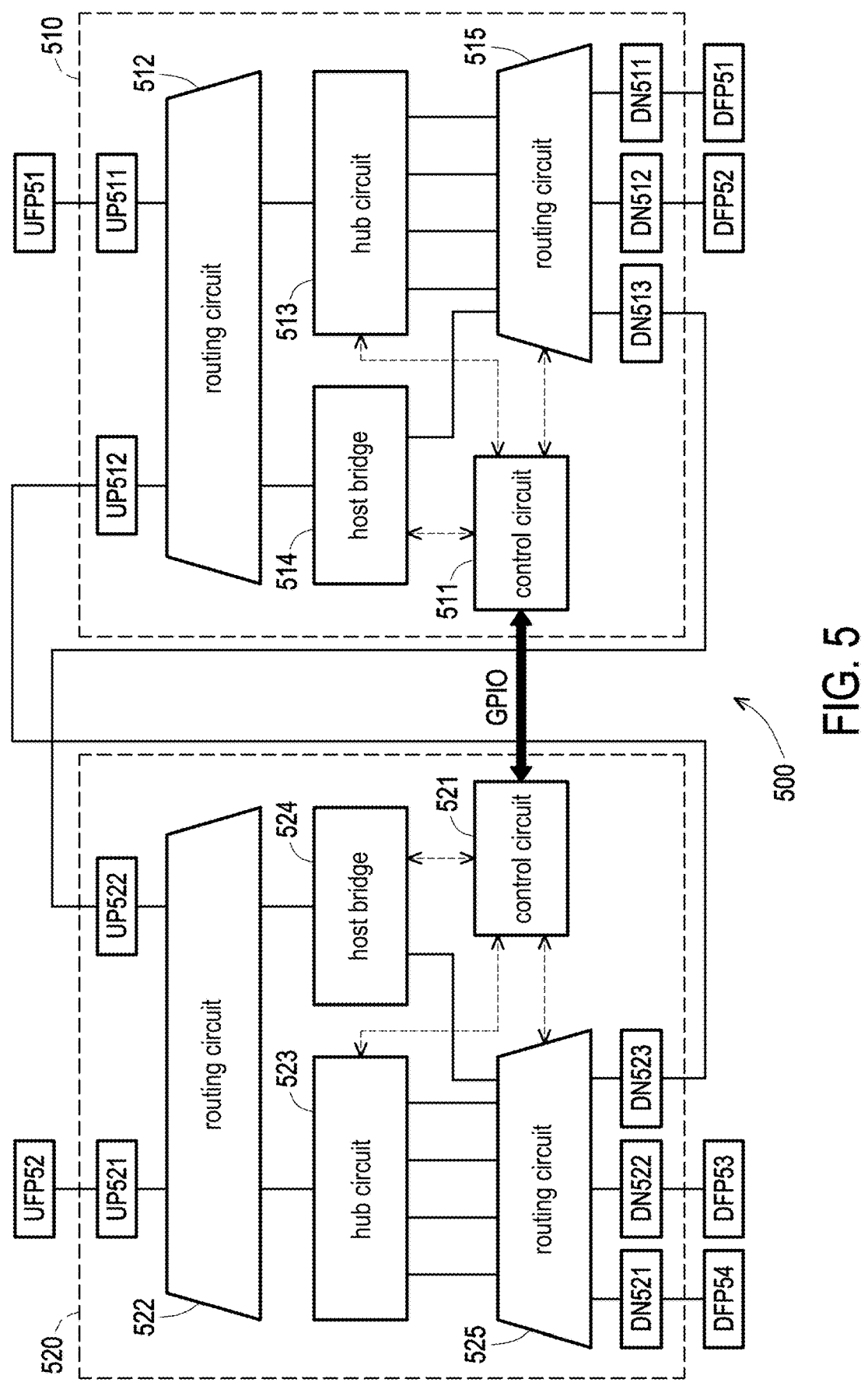
FIG. 5 is a circuit block diagram of an USB hub according to still another embodiment of the disclosure.

FIG. 5 is a circuit block diagram of an USB hub 500 according to still another embodiment of the disclosure. Hub controllers 510 and 520 shown in FIG. 5 can be used as one of many implementation examples of the hub controller shown in FIG. 1 and/or FIG. 2. In addition, upstream-facing-port connectors UFP51, UFP52, downstream-facing-port connectors DFP51, DFP52, DFP53, DFP54, and the hub controllers 510 and 520 shown in FIG. 5 can be referred to and by analogy with relevant descriptions of corresponding components shown in FIG. 1, or FIG. 2, and therefore will not be repeated in the followings. Compared with the USB hub 100 in FIG. 1, the USB hub 500 in FIG. 5 defines the architecture of the hub controllers 510 and 520 in more detail. The hub controller 510 in this embodiment is defined to also include a control circuit 511, a routing circuit 512, a hub circuit 513, a host bridge 514, and a routing circuit 515, and the hub controller 520 is defined to also include a control circuit 521, a routing circuit 522, a hub circuit 523, a host bridge 524, and a routing circuit 525. Upstream-ports and downstream-ports configured by the hub controllers 510 and 520 can be referred to and by analogy with relevant descriptions of corresponding components shown in FIG. 1, and FIG. 2, and therefore will not be repeated in the followings.

In addition, the control circuits 511 and 521 shown in FIG. 5 can be referred to and by analogy with the relevant descriptions of the control circuits 311 and 321 shown in FIG. 3, and therefore will not be repeated in the followings. It should be noted that the control circuit 511 of this embodiment controls the routing circuit 512, the hub circuit 513, the host bridge 514, and the routing circuit 515 according to the mode control information, and the control circuit 521 can control the routing circuit 522, the hub circuit 523, the host bridge 524, and the routing circuit 525 according to the mode control information, thereby changing the operating modes of the hub controllers 510 and 520.

A first port of the routing circuit 512 is coupled to an upstream-port UP511 of the hub controller 510. A second port of the routing circuit 512 is coupled to an upstream-port UP512 of the hub controller 510. A third port of the routing circuit 512 is coupled to a first port of the hub circuit 513. A fourth port of the routing circuit 512 is coupled to a first port of the host bridge 514. The routing circuit 512 is controlled by the control circuit 511 to dynamically determine the coupling relationship between the upstream-ports UP511, UP512, the hub circuit 513, and the host bridge 514. This embodiment does not limit the specific implementation of the routing circuit 512. For example, the routing circuit 512 may include a multiplexer, a demultiplexer, a switching circuit, or other routing circuits.

Multiple ports of the hub circuit 513 are coupled to routing circuit 515. Multiple ports of the routing circuit 515 are respectively coupled to different ports of the hub circuit 513. A fourth port of the routing circuit 515 is coupled to a second port of the host bridge 514. Multiple fifth ports of the routing circuit 515 are coupled to downstream-ports DN511 and DN512 of the hub controller 510. A sixth port of the routing circuit 515 is coupled to a downstream-port DN513 of the hub controller 510. The routing circuit 515 is controlled by the control circuit 511 to dynamically determine the coupling relationship between the downstream-ports DN511, DN512, DN513, the hub circuit 513, and the host bridge 514. In this embodiment, the hub circuit 513 may include an USB router or other USB hub circuit, and the routing circuit 515 may include a multiplexer, a demultiplexer, a switch circuit, or other routing circuits.

The control circuit 521, the routing circuit 522, the hub circuit 523, the host bridge 524, and the routing circuit 525 configured in the hub controller 520 can be referred to and by analogy with the relevant descriptions of corresponding components of the hub controller 510, and therefore will not be repeated in the followings. The host bridge 514 and 524 can provide bridge interfaces so that different hosts can exchange data with each other. For example, based on the control of the control circuit 511, when a first electronic apparatus is connected to the upstream-facing-port connector UFP51 and a second electronic apparatus is connected to the upstream-facing-port connector UFP52, the first electronic apparatus can provide data to the second electronic apparatus through the host bridge 514 and/or the host bridge 524 (and vice versa). The control circuit 511 can control the routing circuit 512, the hub circuit 513, the host bridge 514, and the routing circuit 515 according to the mode control information, and the control circuit 521 can control the routing circuit 522, the hub circuit 523, the host bridge 524, and the routing circuit 525 according to the mode control information, thereby changing the operating modes of the hub controllers 510 and 520.

Figure 6A:
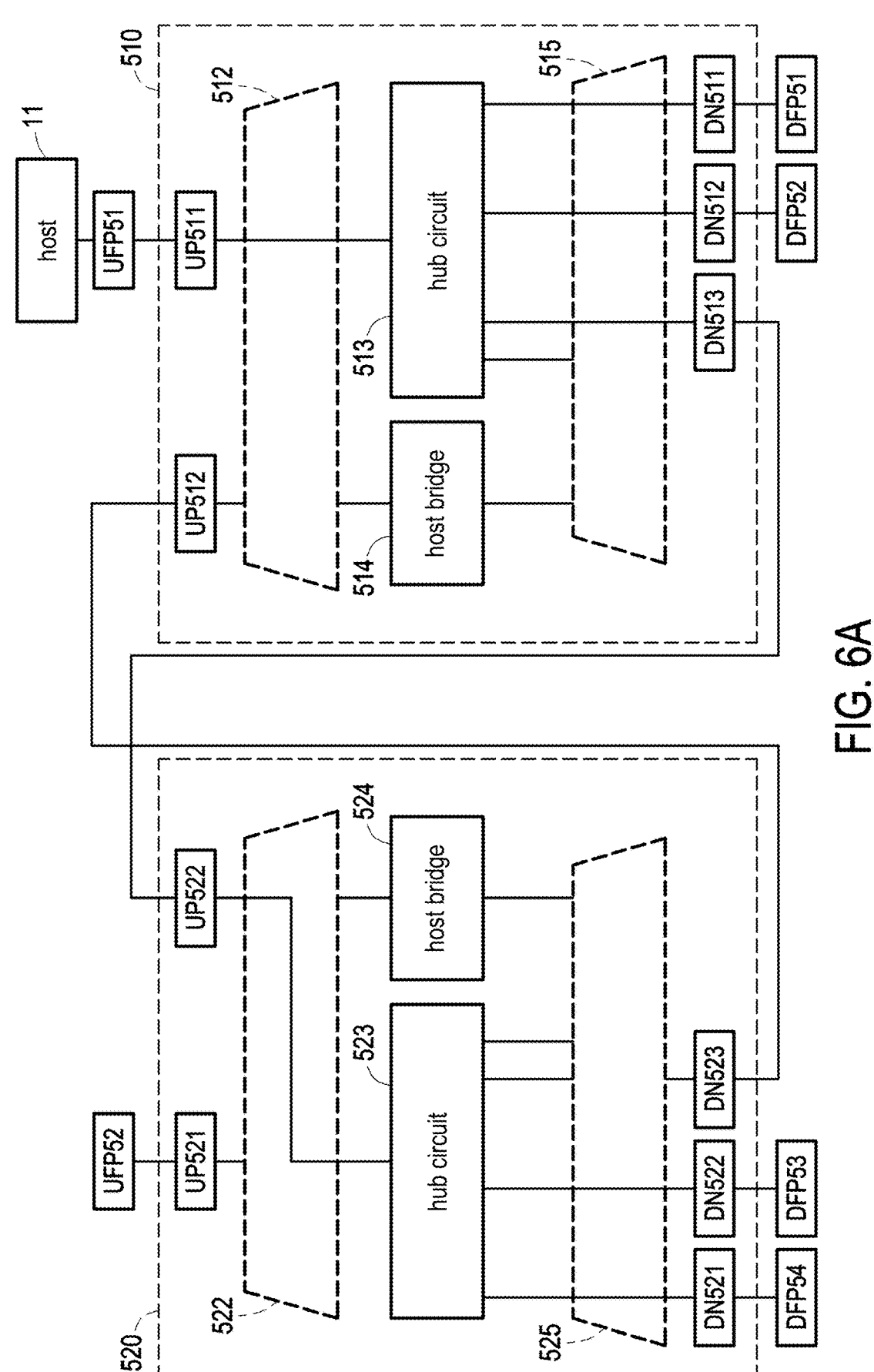
FIG. 6A to FIG. 6J are schematic diagrams of routing switching of a routing circuit shown in different operating scenarios of the disclosure.

FIG. 6A to FIG. 6J are schematic diagrams of routing switching of a routing circuit shown in different operating scenarios of the disclosure. FIG. 6A is a schematic diagram of the circuit shown in FIG. 5 in the first operating scenario. Referring to FIG. 6A first, when the host 11 is coupled to the upstream-facing-port connector UFP51 and the upstream-facing-port connector UFP52 is not coupled to any host, the routing circuit 512 may couple the upstream-port UP511 of the hub controller 510 to the first port of the hub circuit 513, the routing circuit 515 may couple multiple second ports of the hub circuit 513 to the downstream-ports DN511 and DN512 (first downstream-port) of the hub controller 510 respectively, and the routing circuit 515 may couple a third port of the hub circuit 513 to the downstream-port DN513 (second downstream-port) of hub controller 510. In addition, the routing circuit 522 may couple an upstream-port UP522 of the hub controller 520 to the first port of the hub circuit 523, and the routing circuit 525 may couple multiple second ports of the hub circuit 523 to the downstream-ports DN521 and DN522 (first downstream-port) of the hub controller 520 respectively. Thus, in addition to using the resources of the downstream-facing-port connector DFP51 and/or DFP52 through the hub circuit 513, the host 11 may also use the resources of the downstream-facing-port connector DFP53 and/or DFP54 through the hub circuits 513 and 523. The upstream-port UP511, the downstream-port DN511, DN512, and DN513 are enabled, the upstream-port UP512 is disabled, the upstream-port UP522, the downstream-port DN521 and DN522 are enabled, and the upstream-port UP521 and the downstream-port DN523 are disabled.

Figure 6B:
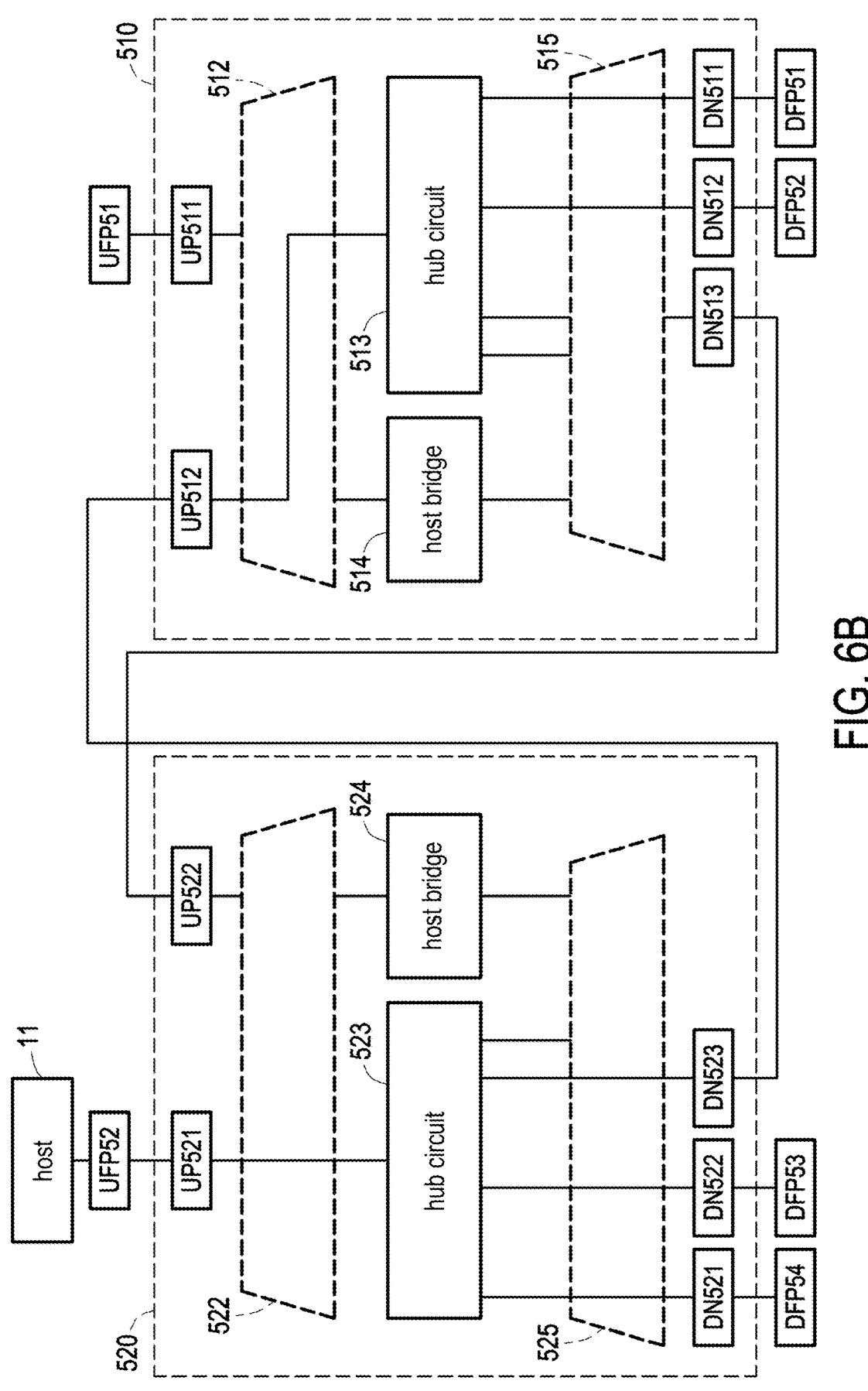

FIG. 6B is a schematic diagram of the circuit shown in FIG. 5 in the second operating scenario. Referring to FIG. 6B, when the host 11 is coupled to the upstream-facing-port connector UFP52 and the upstream-facing-port connector UFP51 is not coupled to any host, the routing circuit 512 may couple the upstream-port UP512 of the hub controller 510 to a first port of the hub circuit 513, and the routing circuit 515 may couple multiple second ports of the hub circuit 513 to the downstream-ports DN511 and DN512 (first downstream-port) of the hub controller 510 respectively. In addition, the routing circuit 522 may couple the upstream-port UP521 of the hub controller 520 to the first port of the hub circuit 523, the routing circuit 525 may couple multiple second ports of the hub circuit 523 to the downstream-ports DN521 and DN522 (first downstream-port) of the hub controller 520 respectively, and the routing circuit 525 may couple a third port of the hub circuit 523 to the downstream-port DN523 (second downstream-port) of the hub controller 520. Thus, in addition to using the resources of the downstream-facing-port connector DFP53 and/or DFP54 through the hub circuit 523, the host 11 may also use the resources of the downstream-facing-port connector DFP51 and/or DFP52 through the hub circuit 523 and the hub circuit 513. The upstream-ports UP512, UP521, the downstream-ports DN511, DN512, DN521, DN522, and DN523 are enabled, and the upstream-ports UP511, UP522, and the downstream-port DN513 are disabled.

FIG. 6C to FIG. 6J are schematic diagrams of the circuit shown in FIG. 5 in the third operating scenario. As shown in FIG. 6C to FIG. 6J, in the third operating scenario, the hosts 11A and 11B are coupled to the upstream-facing-port connectors UFP51 and UFP52 respectively. The hosts 11A and 11B can be referred to the relevant descriptions of the host 11 shown in FIG. 1 or FIG. 2. In the third operating scenario, the control circuit 511 shown in FIG. 5 can control the routing circuit 512, the hub circuit 513, the host bridge 514, and the routing circuit 515 according to the mode control information (hotkey signal), and the control circuit 521 shown in FIG. 5 can control the routing circuit 522, the hub circuit 523, the host bridge 524, and the routing circuit 525 according to the mode control information (hotkey signal), thereby changing the operating modes of the hub controllers 510 and 520. That is, the hub controllers 510 and 520 can selectively operate in one of multiple modes according to the mode control information (hotkey signal) in the third operating scenario, and FIG. 6C to FIG. 6J are schematic diagrams of routing switching in different operating modes.

Figure 6C:
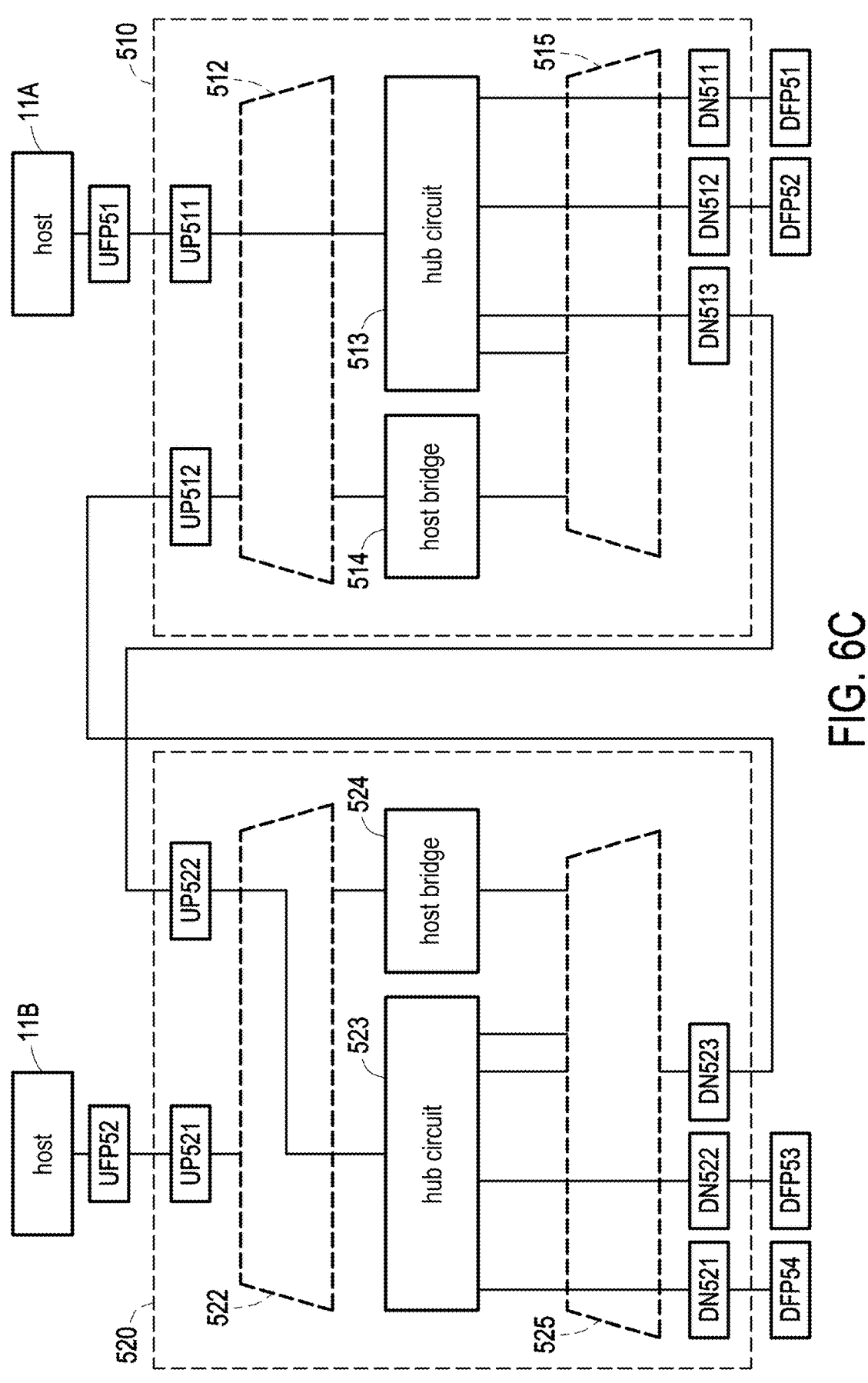

When the hub controllers 510 and 520 selectively operate in the first mode (as shown in FIG. 6C), the routing circuit 512 may couple the upstream-port UP511 of the hub controller 510 to the first port of the hub circuit 513, the routing circuit 515 may couple multiple second ports of the hub circuit 513 to the downstream-ports DN511 and DN512 (first downstream-port) of the hub controller 510 respectively, and the routing circuit 515 may couple the third port of the hub circuit 513 to the downstream-port DN513 (second downstream-port) of the hub controller 510. In addition, the routing circuit 522 may couple the upstream-port UP522 of the hub controller 520 to the first port of the hub circuit 523, and the routing circuit 525 may couple multiple second ports of the hub circuit 523 to the downstream-ports DN521 and DN522 (first downstream-port) of the hub controller 520 respectively. Thus, in addition to using the resources of the downstream-facing-port connector DFP51 and/or DFP52 through the hub circuit 513, the host 11A may also use the resources of the downstream-facing-port connector DFP53 and/or DFP54 through the hub circuits 513 and 523. The upstream-ports UP511, UP522, the downstream-ports DN511, DN512, DN513, DN521, and DN522 are enabled, and the upstream-ports UP512, UP521, and the downstream-port DN523 are disabled.

Figure 6D:
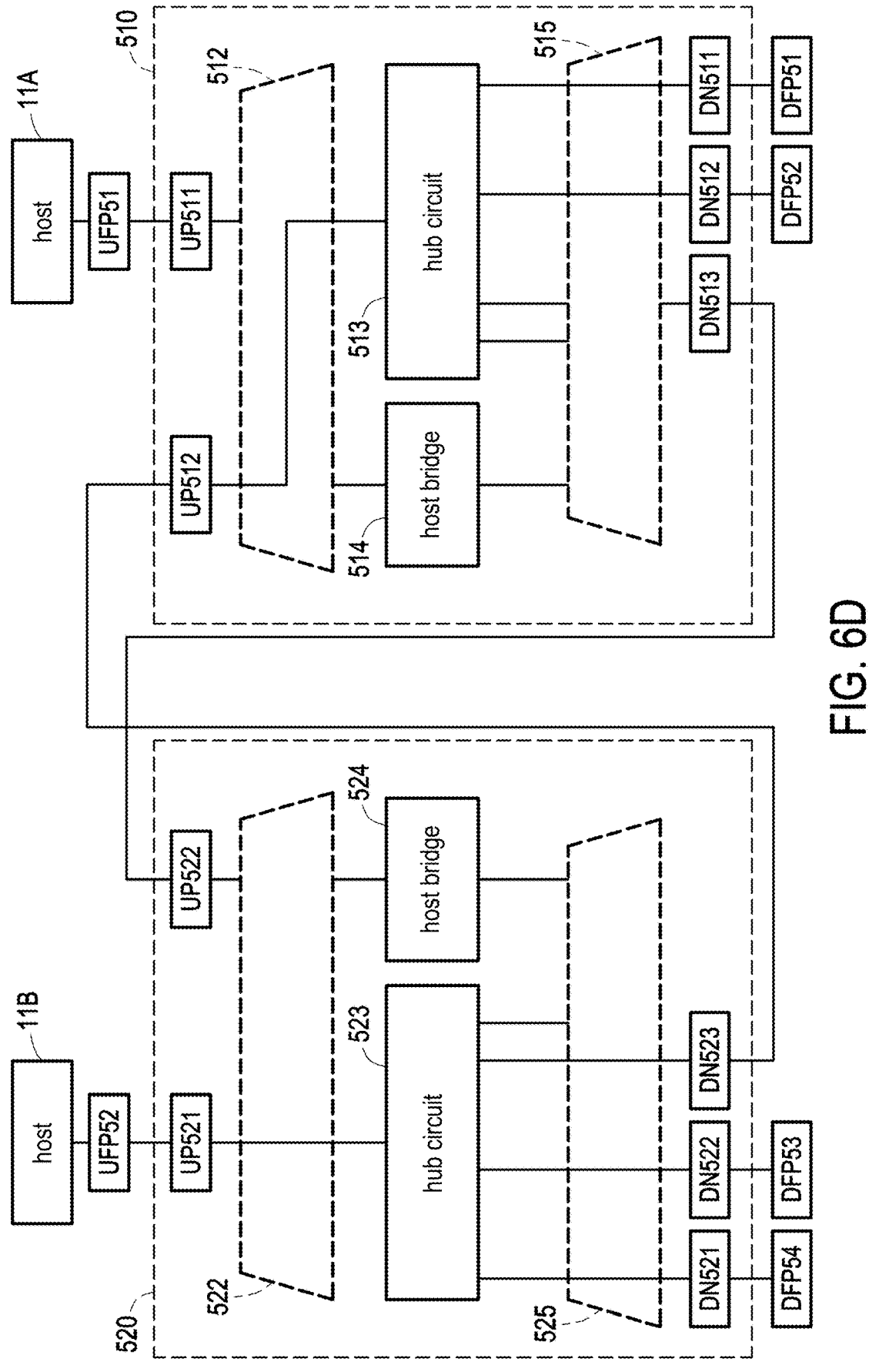

When the hub controllers 510 and 520 selectively operate in the second mode (as shown in FIG. 6D), the routing circuit 512 may couple the upstream-port UP512 of the hub controller 510 to the first port of the hub circuit 513, and the routing circuit 515 may couple multiple second ports of the hub circuit 513 to multiple first downstream-ports (e.g., the downstream-ports DN511 and DN512) of the hub controller 510 respectively. In addition, the routing circuit 522 may couple the upstream-port UP521 of the hub controller 520 to the first port of the hub circuit 523, the routing circuit 525 may couple multiple second ports of the hub circuit 523 to multiple first downstream-ports (downstream-ports DN521 and DN522) of the hub controller 520 respectively, and the routing circuit 525 may couple the third port of the hub circuit 523 to the downstream-port DN523 (second downstream-port) of the hub controller 520. Thus, in addition to using the resources of the downstream-facing-port connector DFP53 and/or DFP54 through the hub circuit 523, the host 11B may also use the resources of the downstream-facing-port connector DFP51 and/or DFP52 through the hub circuits 523 and 513. The upstream-ports UP512, UP521, the downstream-ports DN511, DN512, DN521, DN522, and DN523 are enabled, and the upstream-ports UP511, UP522, and the downstream-port DN513 are disabled.

Figure 6E:
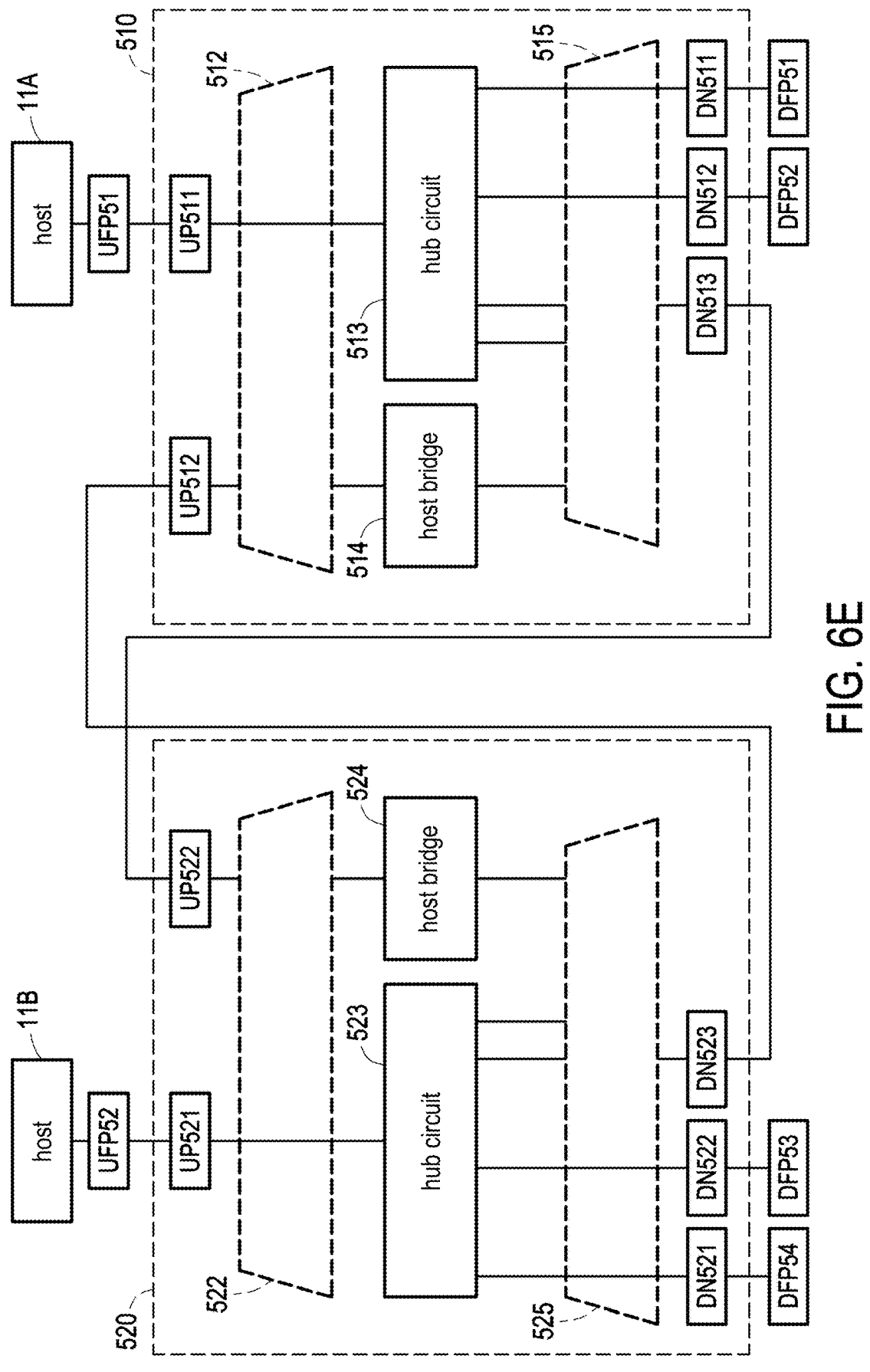

When the hub controllers 510 and 520 selectively operate in the third mode (as shown in FIG. 6E), the routing circuit 512 may couple the upstream-port UP511 of the hub controller 510 to the first port of the hub circuit 513, and the routing circuit 515 may couple multiple second ports of the hub circuit 513 to multiple first downstream-ports (e.g., the downstream-ports DN511 and DN512) of the hub controller 510 respectively. In addition, the routing circuit 522 may couple the upstream-port UP521 of the hub controller 520 to the first port of the hub circuit 523, and the routing circuit 525 may couple multiple second ports of the hub circuit 523 to multiple first downstream-ports (e.g., downstream-ports DN521 and DN522) of the hub controller 520 respectively. Thus, the host 11B may use the resources of the downstream-facing-port connector DFP53 and/or DFP54 through the hub circuit 523, and the host 11A may use the resources of the downstream-facing-port connector DFP51 and/or DFP52 through the hub circuit 513. The upstream-ports UP511, UP521, the downstream-ports DN511, DN512, DN521, and DN522 are enabled, and the upstream-ports UP512, UP522, the downstream-port DN513 and the downstream-port DN523 are disabled.

Figure 6F:
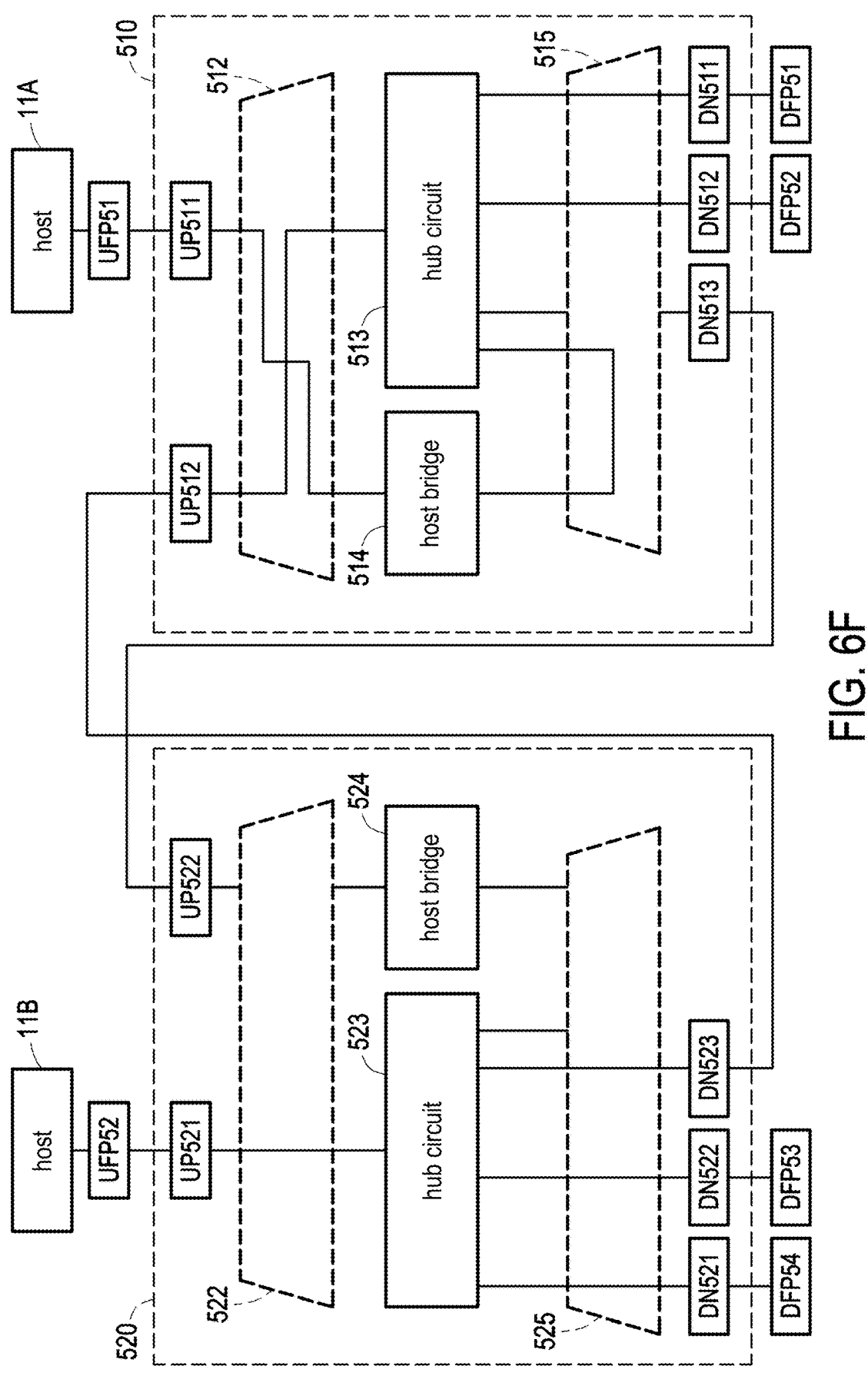

When the hub controllers 510 and 520 selectively operate in the fourth mode (as shown in FIG. 6F), the routing circuit 512 couples the upstream-port UP511 of the hub controller 510 to the first port of the host bridge 514, the routing circuit 512 couples the upstream-port UP512 of the hub controller 510 to the first port of the hub circuit 513, the routing circuit 515 couples the second port of the host bridge 514 to a fourth port of the hub circuit 513, and the routing circuit 515 couples multiple second ports of the hub circuit 513 to multiple first downstream-ports (e.g., the downstream-ports DN511 and DN512) of hub controller 510 respectively. In addition, the routing circuit 522 may couple the upstream-port UP521 of the hub controller 520 to the first port of the hub circuit 523, and the routing circuit 525 may couple multiple second ports of the hub circuit 523 to multiple first downstream-ports (e.g., downstream-ports DN521 and DN522) of the hub controller 520 respectively, and the routing circuit 525 may couple the third port of the hub circuit 523 to the downstream-port DN523 (second downstream-port) of the hub controller 520.

The host bridge 514 can provide a bridge interface so that different hosts can exchange data with each other. When multiple hosts are coupled to different upstream-facing-port connectors of the USB hub 500, the host 11A may communicate with the host 11B through the routing circuit 512, the host bridge 514, the routing circuit 515, the hub circuit 513, the routing circuit 512, the routing circuit 525, the hub circuit 523, and the routing circuit 522 sequentially (and vice versa). In addition, the host 11B may use the resources of the downstream-facing-port connector DFP53 and/or DFP54 through the hub circuit 523, and use the resources of the downstream-facing-port connector DFP51 and/or DFP52 through the hub circuits 523 and 513. In the fourth mode, the upstream-ports UP511, UP512, UP521, the downstream-ports DN511, DN512, DN521, DN522, and DN523 are enabled, and the upstream-port UP522 and the downstream-port DN513 are disabled.

Figure 6G:
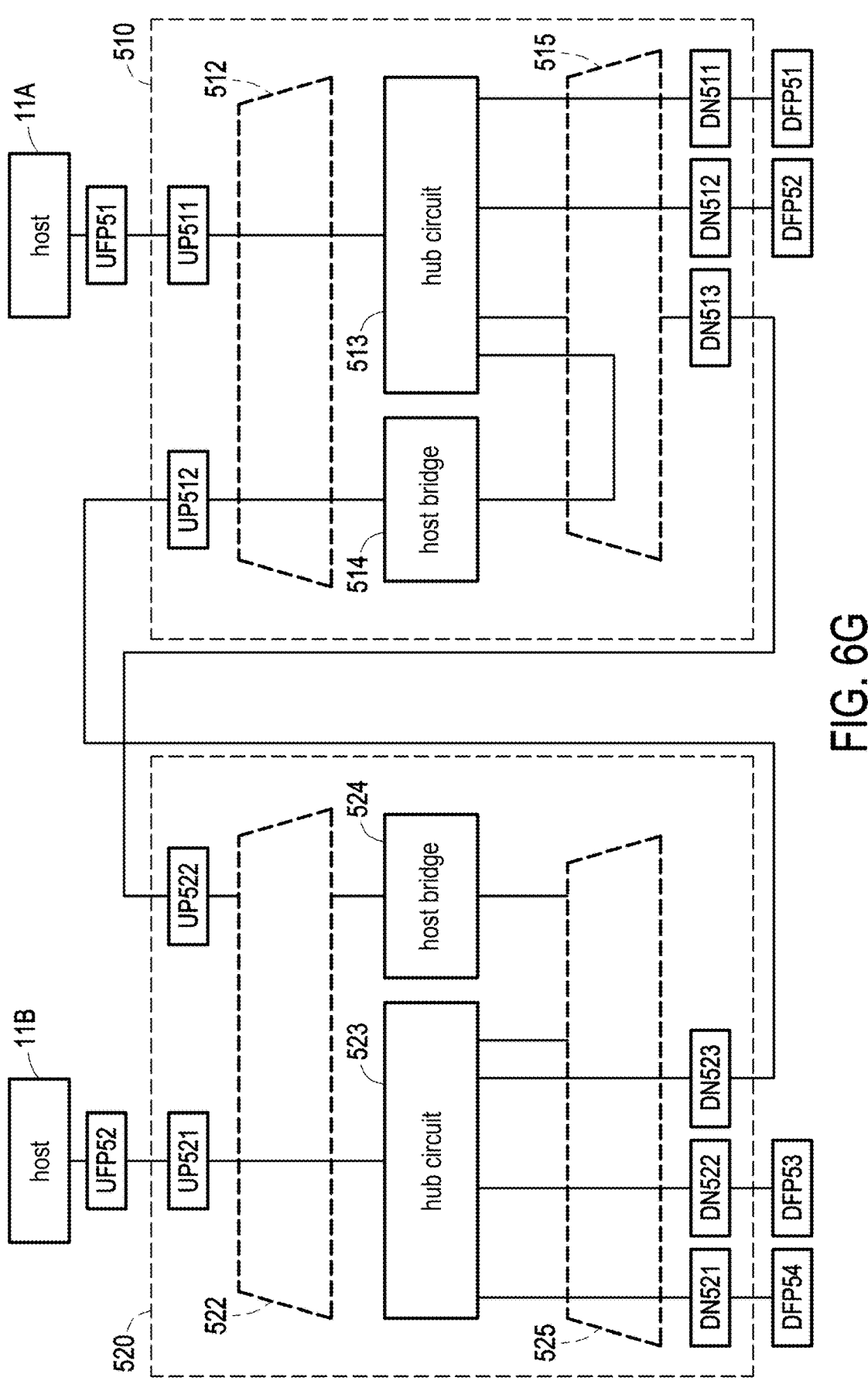

FIG. 6G illustrates another implementation example of the hub controllers 510 and 520 selectively operating in the fourth mode. In this embodiment, the routing circuit 512 couples the upstream-port UP511 of the hub controller 510 to the first port of the hub circuit 513, the routing circuit 512 couples the upstream-port UP512 of the hub controller 510 to the first port of the host bridge 514, the routing circuit 515 couples the second port of the host bridge 514 to the fourth port of the hub circuit 513, and the routing circuit 515 couples multiple second ports of the hub circuit 513 to multiple first downstream-ports (e.g., the downstream-ports DN511 and DN512) of the hub controller 510. In addition, the routing circuit 522 may couple the upstream-port UP521 of the hub controller 520 to the first port of the hub circuit 523, the routing circuit 525 may couple multiple second ports of the hub circuit 523 to multiple first downstream-ports (e.g., the downstream-ports DN521 and DN522) of the hub controller 520 respectively, and the routing circuit 525 may couple the third port of the hub circuit 523 to the downstream-port DN523 (second downstream-port) of the hub controller 520.

The host 11A may communicate with the host 11B through the routing circuit 512, the hub circuit 513, the routing circuit 515, the host bridge 514, the routing circuit 512, the routing circuit 525, the hub circuit 523, and the routing circuit 522 sequentially (and vice versa). In addition, the host 11A may use the resources of the downstreamfacing-port connector DFP51 and/or DFP52 through the hub circuit 513, and the host 11B may use the resources of the downstream-facing-port connector DFP53 and/or DFP54 through the hub circuit 523.

Figure 6H:
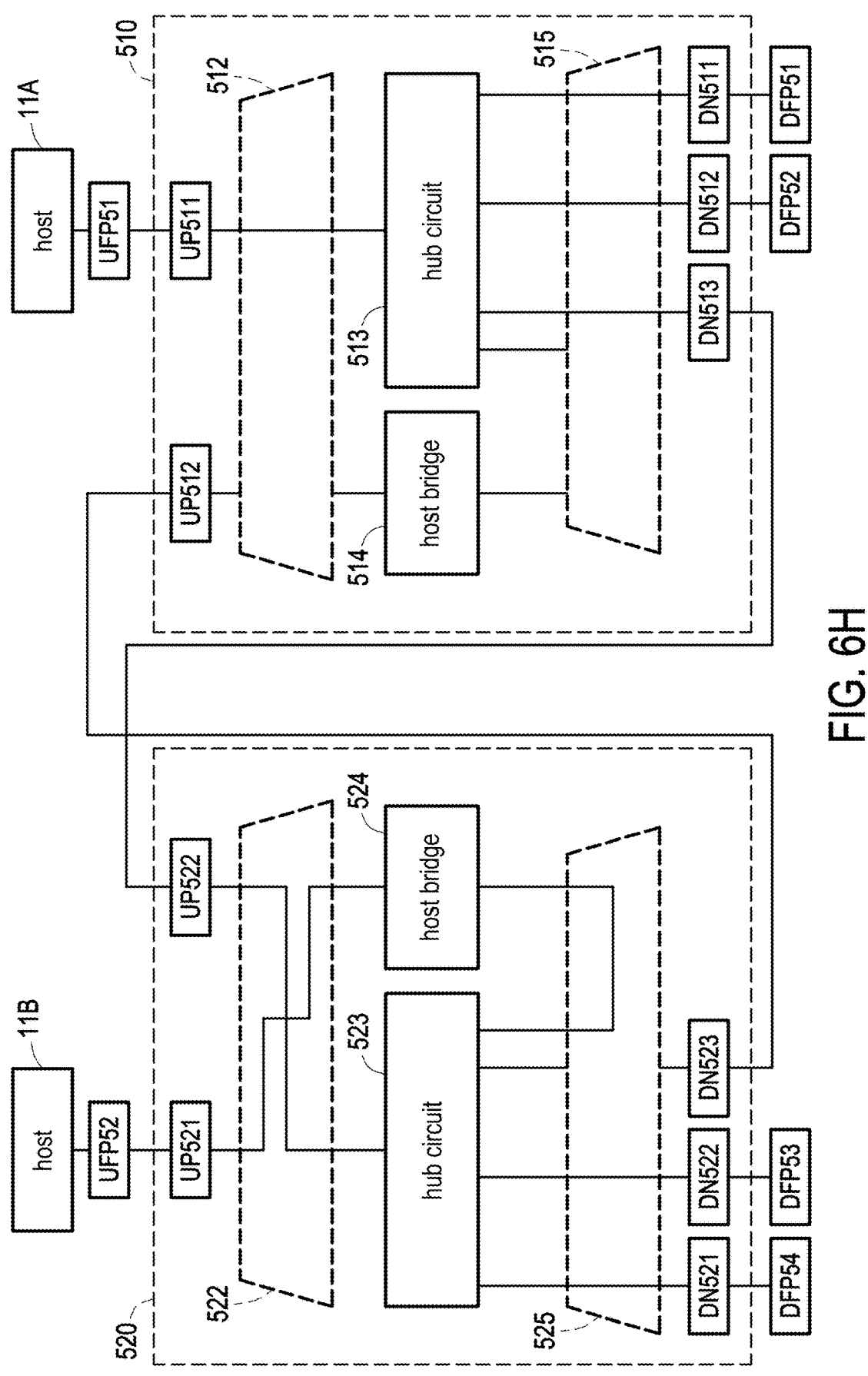

When the hub controllers 510 and 520 selectively operate in the fifth mode (as shown in FIG. 6H), the routing circuit 512 couples the upstream-port UP511 of the hub controller 510 to the first port of the hub circuit 513, the routing circuit 515 couples multiple second ports of the hub circuit 513 to multiple first downstream-ports (e.g., downstream-ports DN511 and DN512) of the hub controller 510 respectively, and the routing circuit 515 couples the third port of the hub circuit 513 to the downstream-port DN513 (second downstream-port) of the hub controller 510. In addition, the routing circuit 522 couples the upstream-port UP521 of the hub controller 520 to the first port of the host bridge 524, the routing circuit 522 couples the upstream-port UP522 of the hub controller 520 to the first port of the hub circuit 523, the routing circuit 525 couples a second port of the host bridge 524 to a fourth port of the hub circuit 523, and the routing circuit 525 couples multiple second ports of the hub circuit 523 to multiple first downstream-ports (e.g., the downstream-ports DN521 and DN522) of the hub controller 520.

The host bridge 524 provides a bridge interface so that different hosts can exchange data with each other. When multiple hosts are coupled to different upstream-facing-port connectors of the USB hub 500, the host 11B may communicate with the host 11A through the routing circuit 522, the host bridge 524, the routing circuit 525, the hub circuit 523, the routing circuit 522, the routing circuit 515, the hub circuit 513, and the routing circuit 512 sequentially (and vice versa). In addition, the host 11A may use the resources of the downstream-facing-port connector DFP51 and/or DFP52 through the hub circuit 513, and the resources of the downstream-facing-port connector DFP53 and/or DFP54 through the hub circuits 513 and 523. In the fifth mode, the upstream-port UP511, the downstream-port DN511, the downstream-port DN512, and the downstream-port DN513 are enabled, the upstream-port UP512 is disabled, the upstream-port UP521, the upstream-port UP522, the downstream-port DN521, and the downstream-port DN522 are enabled, and the downstream-port DN523 is disabled.

Figure 6I:
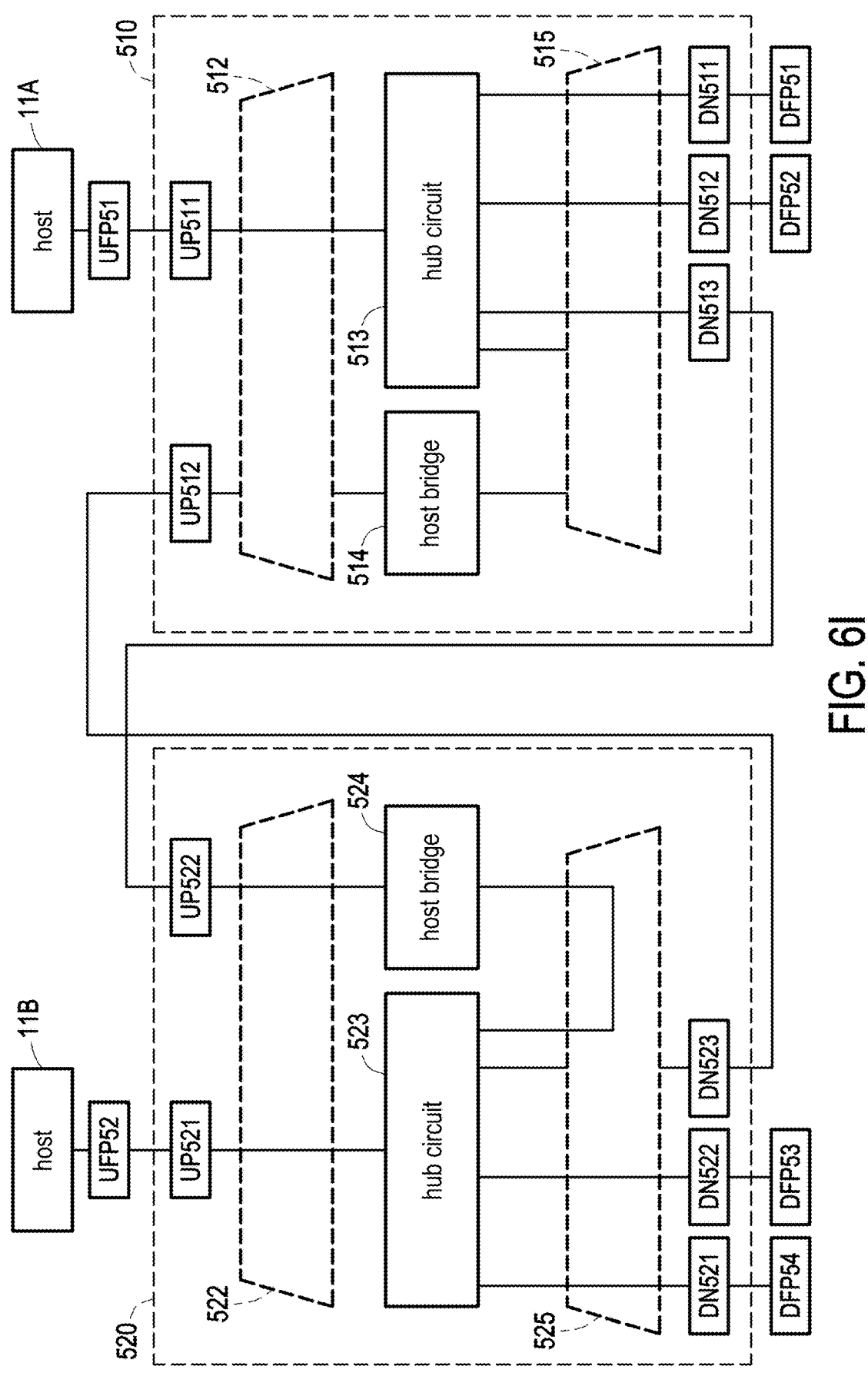

FIG. 6I illustrates another implementation example of the hub controllers 510 and 520 selectively operating in the fifth operating mode. In this embodiment, the routing circuit 512 couples the upstream-port UP511 of the hub controller 510 to the first port of the hub circuit 513, the routing circuit 515 couples multiple second ports of the hub circuit 513 to multiple first ports (e.g., the downstream-ports DN511 and DN512) of the hub controller 510 respectively, and the routing circuit 515 couples the third port of the hub circuit 513 to the downstream-port DN513 (second downstream-port) of the hub controller 510. In addition, the routing circuit 522 may couple the upstream-port UP521 of the hub controller 520 to the first port of the hub circuit 523, the routing circuit 522 may couple the upstream-port UP522 of the hub controller 520 to the first port of the host bridge 524, the routing circuit 525 may couple the second port of the bridge 524 to the fourth port of the hub circuit 523, and the routing circuit 525 couples multiple second ports of the hub circuit 523 to multiple first downstream-ports (e.g., the downstream-ports DN521 and DN522) of the hub controller 520.

The host 11B may communicate with the host 11A through the routing circuit 522, the hub circuit 523, the routing circuit 525, the host bridge 524, the routing circuit 522, the routing circuit 515, the hub circuit 513, and the routing circuit 512 sequentially (and vice versa). In addition, the host 11A may use the resources of the downstream-facing-port connector DFP51 and/or DFP52 through the hub circuit 513, and the host 11B may use the resources of the downstream-facing-port connector DFP53 and/or DFP54 through the hub circuit 523.

Figure 6J:
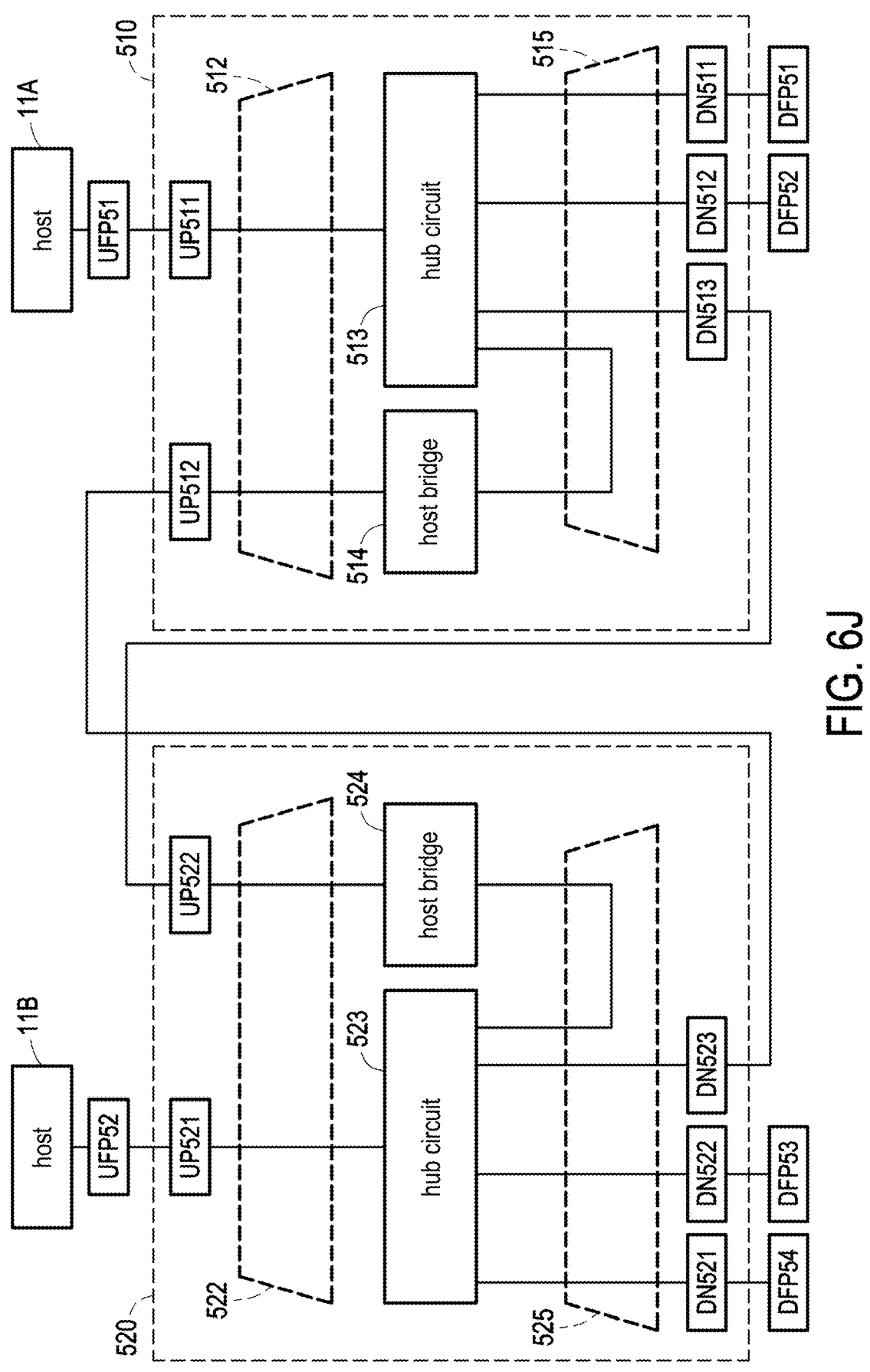

When the hub controllers 510 and 520 selectively operate in the sixth mode (as shown in FIG. 6J), the routing circuit 512 couples the upstream-port UP511 of the hub controller 510 to the first port of the hub circuit 513, the routing circuit 512 couples the upstream-port UP512 of the hub controller 510 to the first port of the host bridge 514, the routing circuit 515 couples the second port of the host bridge 514 to the fourth port of the hub circuit 513, the routing circuit 515 couples multiple second ports of the hub circuit 513 to multiple first downstream-ports (e.g. downstream-ports DN511 and DN512) of the hub controller 510 respectively, and the routing circuit 515 couples the third port of the hub circuit 513 to the downstream-port DN513 (second downstream-port) of the hub controller 510. In addition, the routing circuit 522 couples the upstream-port UP521 of the hub controller 520 to the first port of the hub circuit 523, the routing circuit 522 couples the upstream-port UP522 of the hub controller 520 to the first port of the host bridge 524, the routing circuit 525 couples the second port of the host bridge 524 to the fourth port of the hub circuit 523, the routing circuit 525 couples multiple second ports of the hub circuit 523 to multiple first downstream-ports (e.g., downstream-ports DN521 and DN522) of the hub controller 520 respectively, and the routing circuit 525 couples the third port of the hub circuit 523 to the downstream-port DN523 (second downstream-port) of the hub controller 520.

The host bridges 514 and 524 can provide bridge interfaces so that different hosts can exchange data with each other. When multiple hosts are coupled to different upstream-facing-port connectors of the USB hub 500, the host 11A may communicate with the host 11B through the routing circuit 512, the hub circuit 513, the routing circuit 515, the host bridge 514, the routing circuit 512, the routing circuit 525, the hub circuit 523, and the routing circuit 522 sequentially, and the host 11B may also communicate with the host 11A through the routing circuit 522, the hub circuit 523, the routing circuit 525, the host bridge 524, the routing circuit 522, the routing circuit 515, the hub circuit 513, and the routing circuit 512 sequentially. In addition, the host 11A may use the resources of the downstream-facing-port connector DFP51 and/or DFP52 through the hub circuit 513, and the host 11B may use the resources of the downstream-facing-port connector DFP53 and/or DFP54 through the hub circuit 523.

Figure 7:
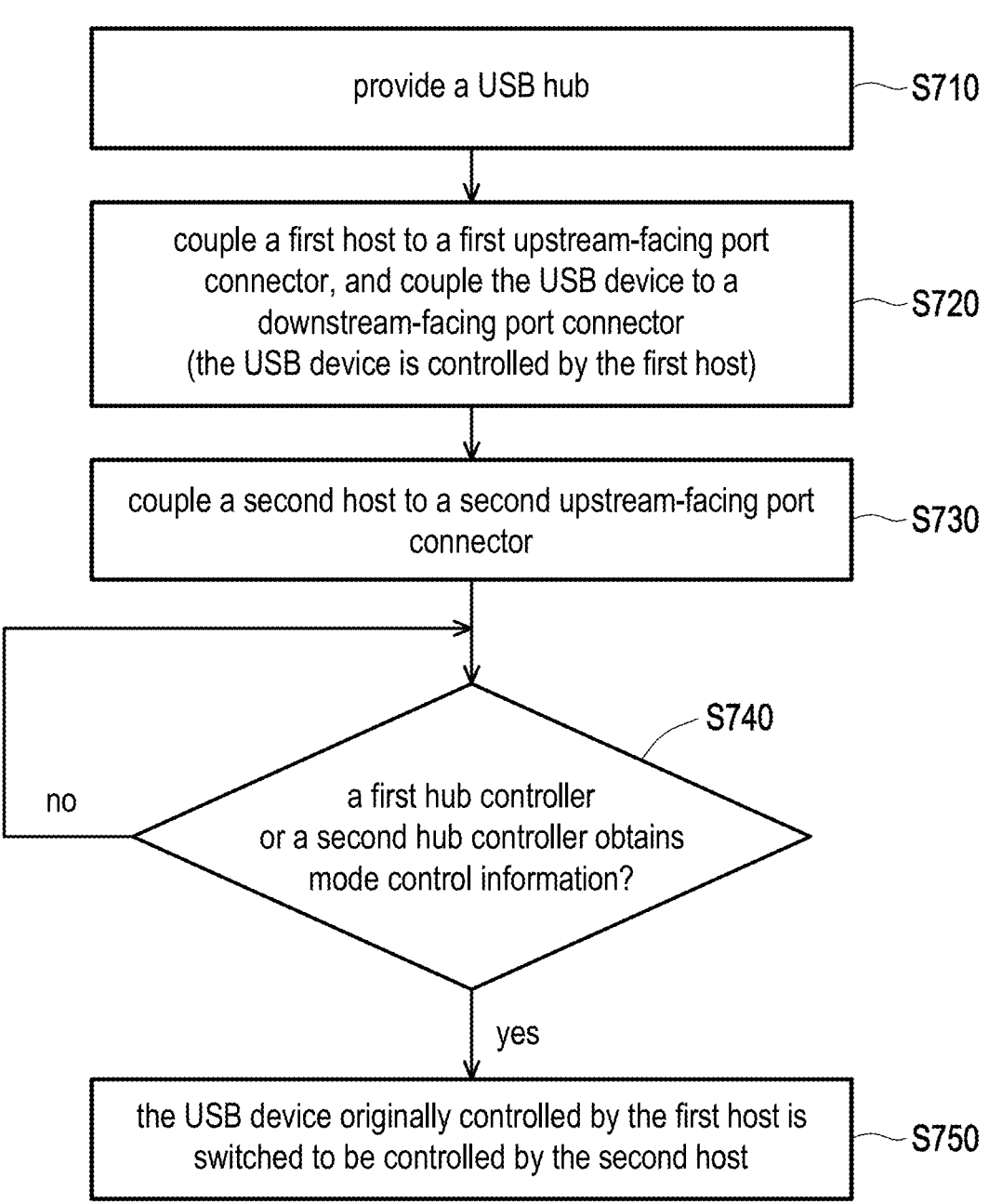
FIG. 7 is a schematic flow chart of a data transmission method of an USB hub according to an embodiment of the disclosure.

FIG. 7 is a schematic flow chart of a data transmission method of an USB hub according to an embodiment of the disclosure. The embodiment shown in FIG. 7 and the above-mentioned embodiments may be cross-referenced to each other's description. The following is an illustration of the embodiment shown in FIG. 7, supplemented by FIG. 1, and the embodiment shown in FIG. 7 can be applied to the USB hub of FIG. 2, FIG. 3, and FIG. 5. Referring to FIG. 1 and FIG. 7, step S710 provides the USB hub 100. In step S720, the first host is coupled to the upstream-facing-port connector UFP11, and the USB device 12 is coupled to one of the downstream-facing-port connectors DFP11, DFP12, DFP13, and DFP14. At this time, the USB device 12 is controlled by the first host coupled to the upstream-facing-port connector UFP11 through the USB hub 100. In step S730, the second host is coupled to the upstream-facing-port connector UFP12. It should be noted that the USB hub 100 in this embodiment may determine whether the hub controller 110 or 120 obtains the mode control information in step S740. When the mode control information obtained by the hub controller 110 or 120 is "requiring the USB device 12 to be controlled by the second host coupled to the upstream-facing-port connector UFP12" (a determination result of step S740 is "yes"), the USB device 12 originally controlled by the first host is switched to be controlled by the second host (step S750).

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A Universal Serial Bus (USB) hub comprising:

a first upstream-facing-port connector;

a second upstream-facing-port connector;

a plurality of downstream-facing-port connectors;

a first hub controller, wherein a first upstream-port of the first hub controller is coupled to the first upstream-facing-port connector, and a first downstream-port of the first hub controller is coupled to a first downstream-facing-port connector among the downstream-facing-port connectors; and a second hub controller, wherein a first upstream-port of the second hub controller is coupled to the second upstream-facing-port connector, a first downstream-port of the second hub controller is coupled to a second downstream-facing-port connector among the down-stream-facing-port connectors, and a communication terminal of the second hub controller is coupled to a communication terminal of the first hub controller, wherein a second upstream-port of the first hub controller is coupled to a second downstream-port of the second hub controller; or a second upstream-port of the second hub controller is coupled to a second downstream-port of the first hub controller; or the second upstream-port of the first hub controller is coupled to the second downstream-port of the second hub controller, and the second upstream-port of the second hub controller is coupled to the second down-stream-port of the first hub controller, wherein when a first host is coupled to the first upstream-facing-port connector and the second upstream-facing-port connector is not coupled to any host, the second upstream-port of the first hub controller is disabled, the first upstream-port and the second downstream-port of the second hub controller are disabled, the first hub controller provides a first transmission path between the first upstream-facing-port connector and the second downstream-port of the first hub controller, and the second hub controller provides a second transmission path between the second downstream-facing-port connector and the second upstream-port of the second hub controller, such that the first host uses resources of the second downstream-facing-port connector through the first hub controller and the second hub controller; or when a second host is coupled to the second upstream-facing-port connector and the first upstream-facing-port connector is not coupled to any host, the first upstream-port and the second downstream-port of the first hub controller are disabled, the second upstream-port of the second hub controller is disabled, the second hub controller provides a third transmission path between the second upstream-facing-port connector and the second downstream-port of the second hub controller, and the first hub controller provides a fourth transmission path between the first downstream-facing-port connector and the second upstream-port of the first hub controller, such that the second host uses resources of the first downstream-facing-port connector through the second hub controller and the first hub controller.

2. The USB hub according to claim 1, wherein when a keyboard is coupled to the first hub controller through one of the downstream-facing-port connectors, the first hub controller decodes a hotkey signal of the keyboard to obtain mode control information, and the first hub controller provides the mode control information to the second hub controller through the communication terminal;

when the keyboard is coupled to the second hub controller through one of the downstream-facing-port connectors, the second hub controller decodes the hotkey signal of the keyboard to obtain the mode control information, and the second hub controller provides the mode control information to the first hub controller through the communication terminal;

the first hub controller changes an operating mode of the first hub controller according to the mode control information; and the second hub controller changes an operating mode of the second hub controller according to the mode control information.

3. The USB hub according to claim 1 further comprising:

at least one key, coupled to the first hub controller, wherein the first hub controller decodes a key signal of the at least one key to obtain mode control information, the first hub controller changes an operating mode of the first hub controller according to the mode control information, the first hub controller provides the mode control information to the second hub controller through the communication terminal, and the second hub controller changes an operating mode of the second hub controller according to the mode control information.

4. The USB hub according to claim 1, wherein, when the first host is coupled to the first upstream-facing-port connector and the second host is coupled to the second upstream-facing-port connector, the first hub controller and the second hub controller selectively operate in one of a plurality of operating modes according to mode control information;

when the first hub controller and the second hub controller selectively operate in a first mode of the operating modes, the second upstream-port of the first hub controller is disabled, the first upstream-port and the second downstream-port of the second hub controller are disabled, the first hub controller provides a first transmission path between the first upstream-facing-port connector and the second downstream-port of the first hub controller, and the second hub controller provides a second transmission path between the second down-stream-facing-port connector and the second upstream-port of the second hub controller, such that the first host uses resources of the second downstream-facing-port connector through the first hub controller and the second hub controller;

when the first hub controller and the second hub controller selectively operate in a second mode of the operating modes, the first upstream-port and the second downstream-port of the first hub controller are disabled, the second upstream-port of the second hub controller is disabled, the second hub controller provides a third transmission path between the second upstream-facing-port connector and the second downstream-port of the second hub controller, and the first hub controller provides a fourth transmission path between the first downstream-facing-port connector and the second upstream-port of the first hub controller, such that the second host uses resources of the first downstream-facing-port connector through the second hub controller and the first hub controller; and when the first hub controller and the second hub controller selectively operate in a third mode of the operating modes, the second upstream-port and the second downstream-port of the first hub controller are disabled, and the second upstream-port and the second downstream-port of the second hub controller are disabled.

5. The USB hub according to claim 1, wherein, when the first host is coupled to the first upstream-facing-port connector and the second host is coupled to the second upstream-facing-port connector, the first hub controller and the second hub controller selectively operate in one of a plurality of operating modes according to mode control information;

when the first hub controller and the second hub controller selectively operate in a fourth mode of the operating modes, the first hub controller provides a fifth transmission path between the first upstream-port of the first hub controller and the second upstream-port of the first hub controller, and the second hub controller provides a sixth transmission path between the second downstream-port of the second hub controller and the first upstream-port of the second hub controller, such that the first host communicates with the second host through the first hub controller and the second hub controller;

when the first hub controller and the second hub controller selectively operate in a fifth mode of the operating modes, the second hub controller provides a seventh transmission path between the first upstream-port of the second hub controller and the second upstream-port of the second hub controller, and the first hub controller provides an eighth transmission path between the second downstream-port of the first hub controller and the first upstream-port of the first hub controller, such that the second host communicates with the first host through the first hub controller and the second hub controller; and when the first hub controller and the second hub controller selectively operate in a sixth mode of the operating modes, the first hub controller provides the fifth transmission path between the first upstream-port of the first hub controller and the second upstream-port of the first hub controller, the first hub controller provides the eighth transmission path between the second downstream-port of the first hub controller and the first upstream-port of the first hub controller, the second hub controller provides the seventh transmission path between the first upstream-port of the second hub controller and the second upstream-port of the second hub controller, and the second hub controller provides the sixth transmission path between the second downstream-port of the second hub controller and the first upstream-port of the second hub controller, such that the first host communicates with the second host through the first hub controller and the second hub controller, and the second host communicates with the first host through the first hub controller and the second hub controller.

6. The USB hub according to claim 1, wherein the first hub controller comprises:

a control circuit coupled to the communication terminal of the first hub controller;

a routing circuit controlled by the control circuit, wherein a first port of the routing circuit is coupled to the first upstream-port of the first hub controller, and a second port of the routing circuit is coupled to the second upstream-port of the first hub controller; and a hub circuit controlled by the control circuit, wherein a first port of the hub circuit is coupled to a third port of the routing circuit, a second port of the hub circuit is coupled to the first downstream-port of the first hub controller, and a third port of the hub circuit is coupled to the second downstream-port of the first hub controller.

7. The USB hub according to claim 6, wherein, when the first host is coupled to the first upstream-facing-port connector and the second upstream-facing-port connector is not coupled to any host, the routing circuit couples the first upstream-port of the first hub controller to the first port of the hub circuit; and when the second host is coupled to the second upstream-facing-port connector and the first upstream-facing-port connector is not coupled to any host, the routing circuit couples the second upstream-port of the first hub controller to the first port of the hub circuit.

8. The USB hub according to claim 6, wherein, when the first host is coupled to the first upstream-facing-port connector and the second host is coupled to the second upstream-facing-port connector, the first hub controller and the second hub controller selectively operate in one of a plurality of operating modes according to mode control information;

when the first hub controller selectively operates in a first mode of the operating modes, the routing circuit couples the first upstream-port of the first hub controller to the first port of the hub circuit;

when the first hub controller selectively operates in a second mode of the operating modes, the routing circuit couples the second upstream-port of the first hub controller to the first port of the hub circuit; and when the first hub controller selectively operates in a third mode of the operating modes, the routing circuit couples the first upstream-port of the first hub controller to the first port of the hub circuit, and the third port of the hub circuit is disabled.

9. The USB hub according to claim 1, wherein the first hub controller comprises:

a control circuit coupled to the communication terminal of the first hub controller;

a first routing circuit controlled by the control circuit, wherein a first port of the first routing circuit is coupled to the first upstream-port of the first hub controller, and a second port of the first routing circuit is coupled to the second upstream-port of the first hub controller;

a hub circuit controlled by the control circuit, wherein a first port of the hub circuit is coupled to a third port of the first routing circuit;

a host bridge controlled by the control circuit, wherein a first port of the host bridge is coupled to a fourth port of the first routing circuit; and a second routing circuit controlled by the control circuit, wherein a first port, a second port, and a third port of the second routing circuit are respectively coupled to a second port, a third port, and a fourth port of the hub circuit, a fourth port of the second routing circuit is coupled to a second port of the host bridge, a fifth port of the second routing circuit is coupled to the first downstream-port of the first hub controller, and a sixth port of the second routing circuit is coupled to the second downstream-port of the first hub controller.

10. The USB hub according to claim 9, wherein, when the first host is coupled to the first upstream-facing-port connector and the second upstream-facing-port connector is not coupled to any host, the first routing circuit couples the first upstream-port of the first hub controller to the first port of the hub circuit, and the second routing circuit couples the second port and the third port of the hub circuit to the first downstream-port and the second downstream-port of the first hub controller respectively; and when the second host is coupled to the second upstream-facing-port connector and the first upstream-facing-port connector is not coupled to any host, the first routing circuit couples the second upstream-port of the first hub controller to the first port of the hub circuit, and the second routing circuit couples the second port of the hub circuit to the first downstream-port of the first hub controller.

11. The USB hub according to claim 9, wherein, when the first host is coupled to the first upstream-facing-port connector and the second host is coupled to the second upstream-facing-port connector, the first hub controller and the second hub controller selectively operate in one of a plurality of operating modes according to mode control information;

when the first hub controller selectively operates in a first mode of the operating modes, the first routing circuit couples the first upstream-port of the first hub controller to the first port of the hub circuit, and the second routing circuit couples the second port and the third port of the hub circuit to the first downstream-port and the second downstream-port of the first hub controller respectively;

when the first hub controller selectively operates in a second mode of the operating modes, the first routing circuit couples the second upstream-port of the first hub controller to the first port of the hub circuit, and the second routing circuit couples the second port of the hub circuit to the first downstream-port of the first hub controller; and when the first hub controller selectively operates in a third mode of the operating modes, the first routing circuit couples the first upstream-port of the first hub controller to the first port of the hub circuit, the second routing circuit couples the second port of the hub circuit to the first downstream-port of the first hub controller, and the second upstream-port and the second downstream-port of the first hub controller are disabled.

12. The USB hub according to claim 9, wherein, when the first host is coupled to the first upstream-facing-port connector and the second host is coupled to the second upstream-facing-port connector, the first hub controller and the second hub controller selectively operate in one of a plurality of operating modes according to mode control information;

when the first hub controller and the second hub controller selectively operate in a fourth mode of the operating modes, the first routing circuit couples the first upstream-port of the first hub controller to the first port of the host bridge, the first routing circuit couples the second upstream-port of the first hub controller to the first port of the hub circuit, the second routing circuit couples the second port of the host bridge to the fourth port of the hub circuit, and the second routing circuit couples the second port of the hub circuit to the first downstream-port of the first hub controller;

when the first hub controller and the second hub controller selectively operate in a fifth mode of the operating modes, the first routing circuit couples the first upstream-port of the first hub controller to the first port of the hub circuit, and the second routing circuit couples the second port and the third port of the hub circuit to the first downstream-port and the second downstream-port of the first hub controller respectively; and when the first hub controller and the second hub controller selectively operate in a sixth mode of the operating modes, the first routing circuit couples the first upstream-port of the first hub controller to the first port of the hub circuit, the first routing circuit couples the second upstream-port of the first hub controller to the first port of the host bridge, the second routing circuit couples the second port of the host bridge to the fourth port of the hub circuit, and the second routing circuit couples the second port and the third port of the hub circuit to the first downstream-port and the second downstream-port of the first hub controller respectively.

13. The USB hub according to claim 9, wherein, when the first host is coupled to the first upstream-facing-port connector and the second host is coupled to the second upstream-facing-port connector, the first hub controller and the second hub controller selectively operate in one of a plurality of operating modes according to mode control information; and when the first hub controller and the second hub controller selectively operate in a fourth mode of the operating modes, the first routing circuit couples the first upstream-port of the first hub controller to the first port of the hub circuit, the first routing circuit couples the second upstream-port of the first hub controller to the first port of the host bridge, the second routing circuit couples the second port of the host bridge to the fourth port of the hub circuit, and the second routing circuit couples the second port of the hub circuit to the first downstream-port of the first hub controller.

14. A USB hub data transmission method comprising:

providing an USB hub, wherein the USB hub comprises a first upstream-facing-port connector, a second upstream-facing-port connector, a plurality of downstream-facing-port connectors, a first hub controller, and a second hub controller, a first upstream-port of the first hub controller is coupled to the first upstream-facing-port connector, a first downstream-port of the first hub controller is coupled to a first downstream-facing-port connector among the downstream-facing-port connectors, a first upstream-port of the second hub controller is coupled to the second upstream-facingport connector, a first downstream-port of the second hub controller is coupled to a second downstream-facing-port connector among the downstream-facing-port connectors, a communication terminal of the second hub controller is coupled to a communication terminal of the first hub controller, a second upstream-port of the second hub controller is coupled to a second downstream-port of the first hub controller, and a second upstream-port of the first hub controller is coupled to a second downstream-port of the second hub controller;

coupling a first host to the first upstream-facing-port connector;

coupling an USB device to one of the downstream-facing-port connectors and controlled by the first host;

coupling a second host to the second upstream-facing-port connector;

determining whether the first hub controller or the second hub controller obtains mode control information;

in response to the mode control information obtained by the first hub controller or the second hub controller being that the USB device is required to be controlled by the second host, the USB device controlled by the first host switching to be controlled by the second host;

in response to the first host being coupled to the first upstream-facing-port connector and the second host being coupled to the second upstream-facing-port connector, selectively operating in one of a plurality of operating modes by the first hub controller and the second hub controller according to the mode control information;

in response to the first hub controller and the second hub controller selectively operating in a first mode of the operating modes, disabling the second upstream-port of the first hub controller, disabling the first upstream-port and the second downstream-port of the second hub controller, providing a first transmission path between the first upstream-facing-port connector and the second downstream-port of the first hub controller by the first hub controller, and providing a second transmission path between the second downstream-facing-port connector and the second upstream-port of the second hub controller by the second hub controller, such that the first host uses resources of the second downstream-facing-port connector through the first hub controller and the second hub controller;

in response to the first hub controller and the second hub controller selectively operating in a second mode of the operating modes, disabling the first upstream-port and the second downstream-port of the first hub controller, disabling the second upstream-port of the second hub controller, providing a third transmission path between the second upstream-facing-port connector and the second downstream-port of the second hub controller by the second hub controller, and providing a fourth transmission path between the first downstream-facing-port connector and the second upstream-port of the first hub controller by the first hub controller, such that the second host uses resources of the first downstream-facing-port connector through the second hub controller and the first hub controller; and in response to the first hub controller and the second hub controller selectively operating in a third mode of the operating modes, disabling the second upstream-port and the second downstream-port of the first hub controller, and disabling the second upstream-port and the second downstream-port of the second hub controller.

15. The USB hub data transmission method according to claim 14, comprising:

in response to the first host being coupled to the first upstream-facing-port connector and the second host being coupled to the second upstream-facing-port connector, selectively operating in one of a plurality of operating modes by the first hub controller and the second hub controller according to the mode control information;

in response to the first hub controller and the second hub controller selectively operating in a fourth mode of the operating modes, providing a fifth transmission path between the first upstream-port of the first hub controller and the second upstream-port of the first hub controller by the first hub controller, and providing a sixth transmission path between the second downstream-port of the second hub controller and the first upstream-port of the second hub controller by the second hub controller, such that the first host communicates with the second host through the first hub controller and the second hub controller;

in response to the first hub controller and the second hub controller selectively operating in a fifth mode of the operating modes, providing a seventh transmission path between the first upstream-port of the second hub controller and the second upstream-port of the second hub controller by the second hub controller, and providing an eighth transmission path between the second downstream-port of the first hub controller and the first upstream-port of the first hub controller by the first hub controller, such that the second host communicates with the first host through the first hub controller and the second hub controller; and in response to the first hub controller and the second hub controller selectively operating in a sixth mode of the operating modes, providing the fifth transmission path between the first upstream-port of the first hub controller and the second upstream-port of the first hub controller by the first hub controller, providing the eighth transmission path between the second downstream-port of the first hub controller and the first upstream-port of the first hub controller by the first hub controller, providing the seventh transmission path between the first upstream-port of the second hub controller and the second upstream-port of the second hub controller by the second hub controller, and providing the sixth transmission path between the second downstream-port of the second hub controller and the first upstream-port of the second hub controller by the second hub controller, such that the first host communicates with the second host through the first hub controller and the second hub controller, and the second host communicates with the first host through the first hub controller and the second hub controller.

16. The USB hub data transmission method according to claim 14, wherein the first hub controller comprises a control circuit, a routing circuit, and a hub circuit, the control circuit is coupled to the communication terminal of the first hub controller, the routing circuit is controlled by the control circuit, a first port of the routing circuit is coupled to the first upstream-port of the first hub controller, a second port of the routing circuit is coupled to the second upstream-port of the first hub controller, the hub circuit is controlled by the control circuit, a first port of the hub circuit is coupled to a third port of the routing circuit, a second port of the hub circuit is coupled to the first downstream-port of the first hub controller, a third port of the hub circuit is coupled to the second downstream-port of the first hub controller, and the USB hub data transmission method comprises:

in response to the first host being coupled to the first upstream-facing-port connector and the second host being coupled to the second upstream-facing-port connector, selectively operating in one of a plurality of operating modes by the first hub controller and the second hub controller according to the mode control information;

in response to the first hub controller selectively operating in a first mode of the operating modes, coupling the first upstream-port of the first hub controller to the first port of the hub circuit by the routing circuit;

in response to the first hub controller selectively operating in a second mode of the operating modes, coupling the second upstream-port of the first hub controller to the first port of the hub circuit by the routing circuit; and in response to the first hub controller selectively operating in a third mode of the operating modes, coupling the first upstream-port of the first hub controller to the first port of the hub circuit by the routing circuit, and disabling the third port of the hub circuit.

17. The USB hub data transmission method according to claim 14, wherein the first hub controller comprises a control circuit, a first routing circuit, a hub circuit, a host bridge, and a second routing circuit, the control circuit is coupled to the communication terminal of the first hub controller, the first routing circuit is controlled by the control circuit, a first port of the first routing circuit is coupled to the first upstream-port of the first hub controller, a second port of the first routing circuit is coupled to the second upstream-port of the first hub controller, the hub circuit is controlled by the control circuit, a first port of the hub circuit is coupled to a third port of the first routing circuit, the host bridge is controlled by the control circuit, and a first port of the host bridge is coupled to a fourth port of the first routing circuit, the second routing circuit is controlled by the control circuit, a first port, a second port, and a third port of the second routing circuit are respectively coupled to a second port, a third port, and a fourth port of the hub circuit, a fourth port of the second routing circuit is coupled to a second port of the host bridge, a fifth port of the second routing circuit is coupled to the first downstream-port of the first hub controller, and a sixth port of the second routing circuit is coupled to the second downstream-port of the first hub controller.

18. The USB hub data transmission method according to claim 17 further comprising:

in response to the first host being coupled to the first upstream-facing-port connector and the second host being coupled to the second upstream-facing-port connector, selectively operating in one of a plurality of operating modes by the first hub controller and the second hub controller according to the mode control information;

in response to the first hub controller selectively operating in a first mode of the operating modes, coupling the first upstream-port of the first hub controller to the first port of the hub circuit by the first routing circuit, and coupling the second port and the third port of the hub circuit to the first downstream-port and the second downstream-port of the first hub controller respectively by the second routing circuit;

in response to the first hub controller selectively operating in a second mode of the operating modes, coupling the second upstream-port of the first hub controller to the first port of the hub circuit by the first routing circuit, and coupling the second port of the hub circuit to the first downstream-port of the first hub controller by the second routing circuit; and in response to the first hub controller selectively operating in a third mode of the operating modes, coupling the first upstream-port of the first hub controller to the first port of the hub circuit by the first routing circuit, coupling the second port of the hub circuit to the first downstream-port of the first hub controller by the second routing circuit, and disabling the second upstream-port and the second downstream-port of the first hub controller.

19. The USB hub data transmission method according to claim 17 further comprising:

in response to the first host being coupled to the first upstream-facing-port connector and the second host being coupled to the second upstream-facing-port connector, selectively operating in one of a plurality of operating modes by the first hub controller and the second hub controller according to the mode control information;

in response to the first hub controller and the second hub controller selectively operating in a fourth mode of the operating modes, coupling the first upstream-port of the first hub controller to the first port of the host bridge by the first routing circuit, coupling the second upstream-port of the first hub controller to the first port of the hub circuit by the first routing circuit, coupling the second port of the host bridge to the fourth port of the hub circuit by the second routing circuit, and coupling the second port of the hub circuit to the first downstream-port of the first hub controller by the second routing circuit;

in response to the first hub controller and the second hub controller selectively operating in a fifth mode of the operating modes, coupling the first upstream-port of the first hub controller to the first port of the hub circuit by the first routing circuit, and coupling the second port and the third port of the hub circuit to the first downstream-port and the second downstream-port of the first hub controller respectively by the second routing circuit; and in response to the first hub controller and the second hub controller selectively operating in a sixth mode of the operating modes, coupling the first upstream-port of the first hub controller to the first port of the hub circuit by the first routing circuit, coupling the second upstream-port of the first hub controller to the first port of the host bridge by the first routing circuit, coupling the second port of the host bridge to the fourth port of the hub circuit by the second routing circuit, and coupling the second port and the third port of the hub circuit to the first downstream-port and the second downstream-port of the first hub controller respectively by the second routing circuit.

20. The USB hub data transmission method according to claim 17 further comprising:

in response to the first host being coupled to the first upstream-facing-port connector and the second host being coupled to the second upstream-facing-port connector, selectively operating in one of a plurality of operating modes by the first hub controller and the second hub controller according to the mode control information; and in response to the first hub controller and the second hub controller selectively operating in a fourth mode of the operating modes, coupling the first upstream-port of the first hub controller to the first port of the hub circuit by the first routing circuit, coupling the second upstream-port of the first hub controller to the first port of the host bridge by the first routing circuit, coupling the second port of the host bridge to the fourth port of the hub circuit by the second routing circuit, and coupling the second port of the hub circuit to the first downstream-port of the first hub controller by the second routing circuit.

* * * * *